(12) United States Patent
Lu et al.

(10) Patent No.: US 10,498,831 B2
(45) Date of Patent: Dec. 3, 2019

(54) COMMUNICATION SESSIONS AT A COAP PROTOCOL LAYER

(71) Applicant: Convida Wireless, LLC, Wilmington, DE (US)

(72) Inventors: Guang Lu, Thornhill (CA); Chonggang Wang, Princeton, NJ (US); Lijun Dong, San Diego, CA (US); Shamim Akbar Rahman, Cote St. Luc (CA); Quang Ly, North Wales, PA (US); Zhuo Chen, Claymont, DE (US); Xu Li, Plainsboro, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 194 days.

(21) Appl. No.: 15/525,642

(22) PCT Filed: Nov. 13, 2015

(86) PCT No.: PCT/US2015/060616
§ 371 (c)(1),
(2) Date: May 10, 2017

(87) PCT Pub. No.: WO2016/077716
PCT Pub. Date: May 19, 2016

(65) Prior Publication Data
US 2018/0295190 A1    Oct. 11, 2018

Related U.S. Application Data

(60) Provisional application No. 62/079,155, filed on Nov. 13, 2014.

(51) Int. Cl.
*G06F 15/16* (2006.01)
*H04L 29/08* (2006.01)

(52) U.S. Cl.
CPC ............ *H04L 67/141* (2013.01); *H04L 67/12* (2013.01); *H04L 67/14* (2013.01); *H04L 67/142* (2013.01);
(Continued)

(58) Field of Classification Search
CPC ......... H04W 4/70; H04W 4/50; H04W 76/10; H04L 67/12
(Continued)

(56) References Cited

U.S. PATENT DOCUMENTS 8,095,658 B2    1/2012 Ashley et al.
2008/0195740 A1*  8/2008 Lowell ................ H04L 29/06
                                                709/229
(Continued)

OTHER PUBLICATIONS

S. Lemay et al, A TCP and TLS Transport for the Constraint Application Protocol (Coap), Sep. 4, 2014, Internet-Draft, pp. 1-4. (Year: 2014).*

(Continued)

*Primary Examiner* — Duyen M Doan
(74) *Attorney, Agent, or Firm* — BakerHostetler

(57) ABSTRACT

Functionality is added to the CoAP and WebSocket protocols to enable the creation of communication sessions, or connections, at a CoAP layer of a communications network. In one aspect, a connection is created at Client server the CoAP layer using CoAP RESTful messages. In another aspect, new CoAP Options are introduced to request initiation and deletion of a connection at the CoAP layer. In yet another aspect, new CoAP Codes are introduced to request initiation and deletion of a connection at the CoAP layer. In a further aspect, new CoAP Tokens are introduced to request initiation and deletion of a connection at the CoAP layer.

23 Claims, 31 Drawing Sheets

(52) U.S. Cl.
CPC .......... *H04L 67/143* (2013.01); *H04L 67/146* (2013.01); *H04L 67/147* (2013.01); *Y04S 40/18* (2018.05)

(58) Field of Classification Search
USPC ................................................ 709/203, 227
See application file for complete search history.

(56) References Cited

U.S. PATENT DOCUMENTS

| | | | |
|---|---|---|---|
| 2012/0151028 A1* | 6/2012 | Lu ........................ | H04W 4/18 709/223 |
| 2014/0140254 A1* | 5/2014 | Nieminen .............. | H04W 4/70 370/311 |
| 2015/0033312 A1* | 1/2015 | Seed ...................... | H04W 4/70 726/7 |
| 2016/0006818 A1* | 1/2016 | Van Den Abeele ...................... | H04L 67/2819 709/227 |
| 2016/0088049 A1* | 3/2016 | Seed ...................... | H04W 4/70 709/203 |
| 2016/0094673 A1* | 3/2016 | Savolainen ............ | H04L 67/12 709/202 |
| 2017/0325125 A1* | 11/2017 | Novo Diaz ............ | H04L 29/06 |

OTHER PUBLICATIONS

Shelby et al., "Constrained Application Protocol (CoAP) draft-ieft-core-coap-18", CoRE Working Group, Jun. 28, 2013, 118 pages.
Savolainen, "CoAP Over WebSockets: Draft-Savolainen-Core-COAP-Websockets-3", Internet Engineering Task Force IETF, Oct. 7, 2014, pp. 1-17.
Rescorla et al., "Datagram Transport Layer Security Version 1.2.", RFC 6347, Jan. 2012, 32 pages.
Nottingham et al., "Defining Well-Known Uniform Resource Identifiers (URI's)", (IETF) Internet Engineering Task Force, RFC 5785, Apr. 2010, 8 pages.
Hartke, "Obsering Resources in CoAP draft-ietf-core-observe-13", CoRE Working Group, Apr. 10, 2014, 32 pages.
Fette et al., "The WebSocket Protocol", (IETF) Internet Engineering Task Force, RFC 6455, Dec. 2011, 71 pages.
Dierks et al., The Transport Layer Security (TLS) Protocol Version 1.2, Network Working Group, RFC 5246, Aug. 2008, 104 pages.
Barth et al., "HTTP State Management Mechanism", (IETF) Internet Engineering Task Force, RFC 6265, Apr. 2011, 37 pages.

* cited by examiner

COMMUNICATION SESSIONS AT A COAP PROTOCOL LAYER

CROSS REFERENCE TO RELATED APPLICATIONS

This application is a National Stage Application filed under 35 U.S.C. 371 of International Application No. PCT/US2015/060616, filed Nov. 13, 2015, which claims benefit under 35 U.S.C. § 119(e) of U.S. Patent Application No. 62/079,155, filed Nov. 14, 2014, and entitled "Communication Sessions at a COAP Protocol Layer," the content of which is incorporated by reference herein in its entirety.

BACKGROUND

Communication sessions, also commonly referred to as "connections," may exist at different layers of a communications protocol stack, such as the communications protocol stack illustrated in FIG. 1. A communication session, or connection, is a semi-permanent interactive information exchange between two or more communicating nodes, or between a computer and user, that is set up or established at a certain point in time and torn down at a later point in time. A communication session/connection typically involves the exchange of more than one message in either direction, and a communication session/connection may be stateful, meaning that at least one of the communicating parties needs to save information about the session history in order to be able to communicate. Some stateless protocols may support stateful operations using various mechanisms. For example, the HTTP cookie is a widely used mechanism for a web browser to track and exchange previous activities.

The Internet Engineering Task Force (IETF) Constrained RESTful Environments (CoRE) Working Group (IETF CoRE) has developed Constrained Application Protocol (CoAP). CoAP is a web transfer protocol for use with constrained (e.g., low-power, lossy) nodes and constrained networks.

The interaction model of CoAP is similar to the client/server model of Hypertext Transfer Protocol (HTTP). CoAP uses a two-layer approach, as shown in FIG. 2: a CoAP messaging layer for handling UDP and the asynchronous nature of the interactions; and a request/response interactions layer that uses Methods and Response codes. Current Methods include GET, PUT, POST, and DELETE.

CoAP defines four types of messages: CON, NON, ACK, and RST. A Confirmable message (CON) is retransmitted using a default timeout and exponential back-off between retransmissions until the recipient sends an Acknowledgement message (ACK) with the same Message ID. FIG. 3 shows an example of a CON with ACK of the same Message ID 0x7d34. A Non-confirmable message (NON) does not require reliable transmission. For example, each single measurement out of a stream of sensor data can be sent as a Non-confirmable message. NONs are not acknowledged, but still have a Message ID for duplicate detection. An example of a NON with Message ID 0x01a0 is shown in FIG. 4. An ACK is used to acknowledge receipt of the CON, and a Reset message (RST) may be used when a recipient is not able to process a NON.

CoAP request and response semantics are carried in CoAP messages, which include either a Method code or Response code, respectively. Optional or default request and response information, such as the URI and payload media type, is carried as CoAP Options. A Token is used to match responses to requests independently from the underlying messages.

A request is carried in a CON or NON, and if immediately available, the response to a request carried in a CON is carried in the resulting ACK. This is called a piggy-backed response, as shown in FIG. 5. If a request is sent in a NON, then the response is sent using a new NON.

CoAP messages are encoded in a simple binary format, shown in FIG. 6. The message format starts with a fixed-size 4-byte header, which includes Version, Type, Token Length, Code, and Message ID fields. This header is followed by a variable-length Token value which can be 0-8 bytes long. Following the Token value is a sequence of zero or more CoAP Options in Type-Length-Value (TLV) format, optionally followed by a payload that occupies the rest of the datagram.

Version (Ver) is a 2-bit unsigned integer that indicates the CoAP version number.

Type (T) is a 2-bit unsigned integer that indicates if this message is of type CON (0), NON (1), ACK (2) or RST (3).

Token Length (TKL) is a 4-bit unsigned integer that indicates the length of the variable-length Token field, which ranges from 0-8 bytes. Lengths 9-15 are reserved, must not be sent, and must be processed as a message format error.

Code is an 8-bit unsigned integer that is split into a 3-bit class (c) and a 5-bit detail (dd) wherein the class comprises the most significant bits and the detail comprises the least significant bits. Code is documented as c.dd, where c is a digit from 0-7 for the 3-bit subfield, and dd are two digits from 00-31 for the 5-bit subfield. The class can indicate a request (0), a success response (2), a client error response (4), or a server error response (5). All other class values are reserved. As a special case, Code 0.00 indicates an empty message. In the case of a request, the Code field indicates the Request Method, and in the case of a response, it indicates a Response Code. The CoAP code registry is as follows: 0.00 indicates an empty message; 0.01-0.31 indicates a request, and values in this range are assigned by the "CoAP Method Codes" sub-registry; 1.00-1.31 is reserved; 2.00-5.31 indicates a response, and values in this range are assigned by the "CoAP Response Codes" sub-registry; and 6.00-7.31 is reserved.

Message ID is a 16-bit unsigned integer in network byte order. The Message ID is used for the detection of message duplication, and to match messages of type ACK/RST to messages of type CON/NON.

Token is a variable length field and may range from 0-8 bytes, as indicated by the Token Length field. The Token value is used to correlate requests and responses.

The Options field allows for the inclusion of CoAP Options and may be followed by the end of the message, by another Option, or by the Payload Marker and the payload, as discussed below.

CoAP defines a number of options which may be included in a message. Each Option instance in a message specifies the Option Number of the defined CoAP Option, the length of the Option Value, and the Option Value itself. Option Value can be empty, opaque, an unsigned integer, or a string. Both requests and responses may include a list of one or more Options. CoAP defines a single set of Options that are used in both requests and responses.

Options are either "critical" or "elective". An Option is identified by an Option Number, which also provides some additional semantics information. For example, odd numbers indicate a critical Option, while even numbers indicate an elective Option. The difference between these is how an Option unrecognized by an endpoint is handled. Upon reception, unrecognized Options of class "elective" must be silently ignored. Unrecognized Options of class "critical" that occur in a CON request must cause the return of a 4.02, Bad Option, response. Unrecognized Options of class "critical" that occur in a CON response, or piggy-backed in an ACK, must cause the response to be rejected. Unrecognized Options of class "critical" that occur in a NON must cause the message to be rejected.

Options are also classified based on how a proxy is to deal with the Option if the proxy does not recognize it. For this purpose, an Option can either be considered Unsafe-to-Forward, in which UnSafe is set, or Safe-to-Forward, in which UnSafe is not set. In addition, for an Option that is marked Safe-to-Forward, the Option Number indicates whether or not it is intended to be part of the Cache-Key in a request. If some of the NoCacheKey bits are 0, the Option is part of the Cache-Key, and if all NoCacheKey bits are 1, the Option is not part of the Cache-Key. An Option that is repeatable may be included one or more times in a message.

Table 1 displays the properties of CoAP Options using two examples defined in the current CoAP specification: Proxy-scheme and Size1.

TABLE 1

Properties of Options

| No. Number | C Critical | U Unsafe | N NoCacheKey | R Repeatable | Name | Format | Length | Default |
|---|---|---|---|---|---|---|---|---|
| 39 | x | x | — | | Proxy-scheme | String | 1-255 | (none) |
| 60 | | | x | | Size1 | Uint | 0-4 | (none) |

The CoAP Options are maintained by an Internet Assigned Numbers Authority (IANA) registry. The IANA policy for future additions to this sub-registry is split into three tiers. The range 0-255 is reserved for Options defined by the IETF, range 256-2047 is reserved for commonly used Options with public specifications, and range 2048-64999 is for all other Options, including private or vendor-specific Options.

CoAP defines four methods, GET, POST, PUT and DELETE.

The GET method retrieves a representation for the information that currently corresponds to the resource identified by the request URI. Upon success, a 2.05 (Content) or 2.03 (Valid) response code should be present in the response.

The POST method requests that the representation enclosed in the request be processed. The actual function performed by the POST method is determined by the origin server and dependent on the target resource. POST usually results in the creation of a new resource or updating of the target resource.

The PUT method requests that the resource identified by the request URI be updated or created with the enclosed representation. If a resource exists at the request URI, the enclosed representation should be considered a modified version of that resource, and a 2.04 (Changed) response code should be returned. If no resource exists, then the server may create a new resource with that URI, resulting in a 2.01 (Created) response code.

The DELETE method requests that the resource identified by the request URI be deleted.

CoAP also allows the use of proxies. A forward-proxy is explicitly selected by a client and acts on behalf of the client. To the server, the request from the proxy is as if coming from the client. All Options selected in a message to a forward-proxy request must be processed at the proxy. CoAP distinguishes between requests made to an origin server and a request made through a forward-proxy. A reverse-proxy is inserted to stand in for origin servers. To the client, the response from the proxy is as if coming from the server. A reverse-proxy may or may not interpret the request.

CoAP core protocol is Request-Response based and does not work well when a client is interested in having the resource representation over a period of time. CoAP Observe extends the CoAP core protocol with a mechanism for a CoAP client to "observe" a resource on a CoAP server. The client can retrieve a representation of the resource and request this representation be updated by the server as long as the client is interested in the resource. Observe is a subscribe-notification mechanism for one Request to get multiple Responses. It can be viewed as a form of session, for the purpose of notifications, as illustrated in FIG. 7

The CoAP base protocol defines that CoAP can be provisioned in "NoSec" mode, meaning without using Datagram Transport Layer Security (DTLS), or it can be provisioned using DTLS for security. The DTLS protocol is designed to secure data between communicating applications. DTLS is largely based on Transport Layer Security (TLS), but DTLS operates over UDP and is used for UDP or other connectionless based protocols. Datagram transport such as UDP does not require or provide reliable or in-order delivery of data. The DTLS protocol provides such in-order delivery for payload data by using a sequence number. To initiate a connection session, DTLS supports a handshake protocol, which opens the session, and each session has a session identifier. DTLS explicitly uses a sequence number for DTLS records, which are encapsulated data to be exchanged via the connection session. To utilize DTLS, the node acting as the CoAP client should also act as the DTLS client.

The WebSocket protocol is designed to provide full-duplex communications channels for web browsers and web servers over a single TCP connection. A bi-directional ongoing conversation can take place between a browser and server without needing to open multiple HTTP connections or performing long polling as was required in the past. WebSocket provides a standardized way for a server to send content to a browser without being solicited by the client. It allows messages to be passed back and forth while keeping the connection open and enables live content and the creation of real-time games.

WebSocket utilizes an opening handshake followed by basic messaging layered over TCP using TCP port number 80, the same port that HTTP uses. Using this port provides the advantage that WebSocket traffic can pass through most existing firewalls. The only relationship WebSocket has to HTTP is the opening handshake used to establish a connection. The handshake is formatted as an HTTP upgrade request so that HTTP servers are able to recognize it and WebSocket can then use port 80. Once a WebSocket connection is established, data frames are exchanged. FIG. 8 illustrates basic WebSocket procedures.

The IETF CoRE received a proposal for a CoAP over WebSocket protocol. CoAP over WebSocket addresses the environment where UDP transport is not available. One such example is a corporate network where Internet access is only available via an HTTP proxy. Another such example is a CoAP application running in a web browser which has access only to HTTP and WebSocket. The protocol's layer diagram is shown in FIG. 9. Note that CoAP over WebSocket involves HTTP and TCP.

CoAP over WebSocket begins with an opening handshake. To accomplish this, a WebSocket Connection needs to be established in accordance with RFC6455, and the WebSocket client must include "coap.v1" as its sub-protocol name. After the opening handshake, CoAP requests and responses are exchanged as WebSocket messages. Messages are transmitted in binary data frames because CoAP uses a binary message format. The CoAP requests and responses are exchanged asynchronously over the WebSocket Connection. The process of closing the CoAP over WebSocket connection is identical to that of the traditional WebSocket protocol, as found in RFC6455.

SUMMARY

CoAP was created to be a lightweight protocol for M2M applications. It is suited for short and independent transactions. Because UDP is connection-less, and CoAP is RESTful, there is no persistent connection supported by the native CoAP/UDP architecture. However, there are environments that would benefit from both a lightweight transport of UDP, and some level of connection and stateful operations at the CoAP layer.

Embodiments disclosed herein provide added functionality to the CoAP and WebSocket protocols to enable the creation of communication sessions, or connections, at a CoAP layer of a communications network. In one aspect, a connection is created at the CoAP layer using CoAP RESTful messages. In another aspect, new CoAP Options are introduced to request initiation and deletion of a connection at the CoAP layer. In yet another aspect, new CoAP Codes are introduced to request initiation and deletion of a connection at the CoAP layer. In a further aspect, new CoAP Tokens are introduced to request initiation and deletion of a connection at the CoAP layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
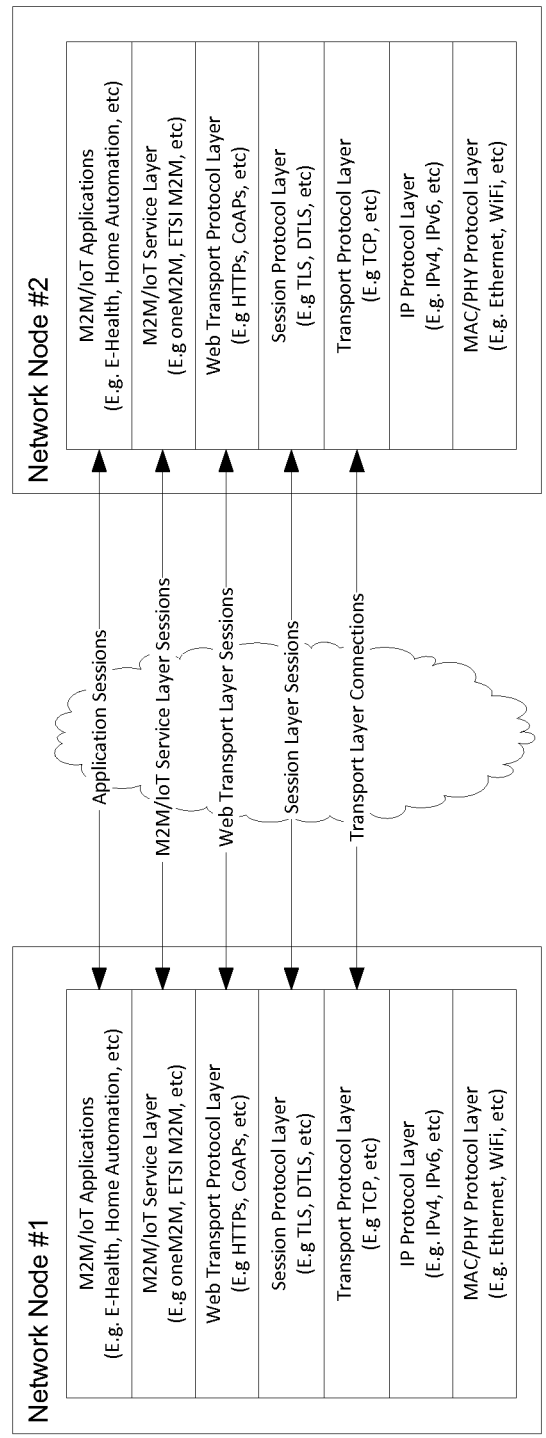
FIG. 1 illustrates a communication protocol stack.
Figure 2:
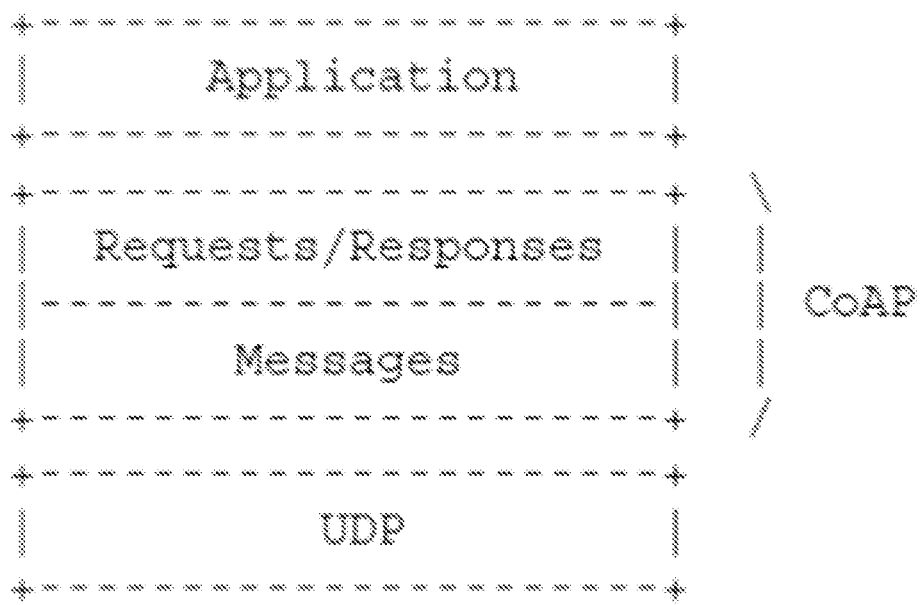
FIG. 2 illustrates the interaction model of the CoAP protocol.
Figure 3:
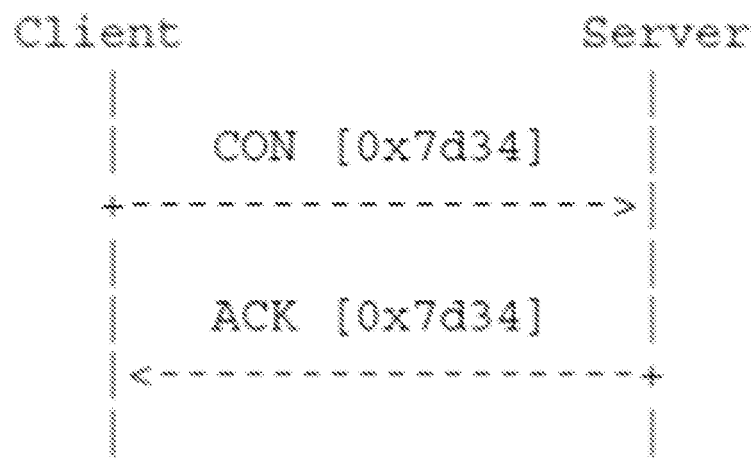
FIG. 3 shows an example message flow in accordance with the CoAP protocol.
Figure 4:
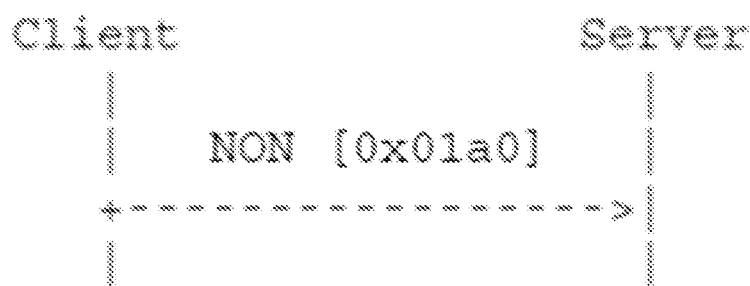
FIG. 4 shows another example message flow in accordance with the CoAP protocol.
Figure 5:
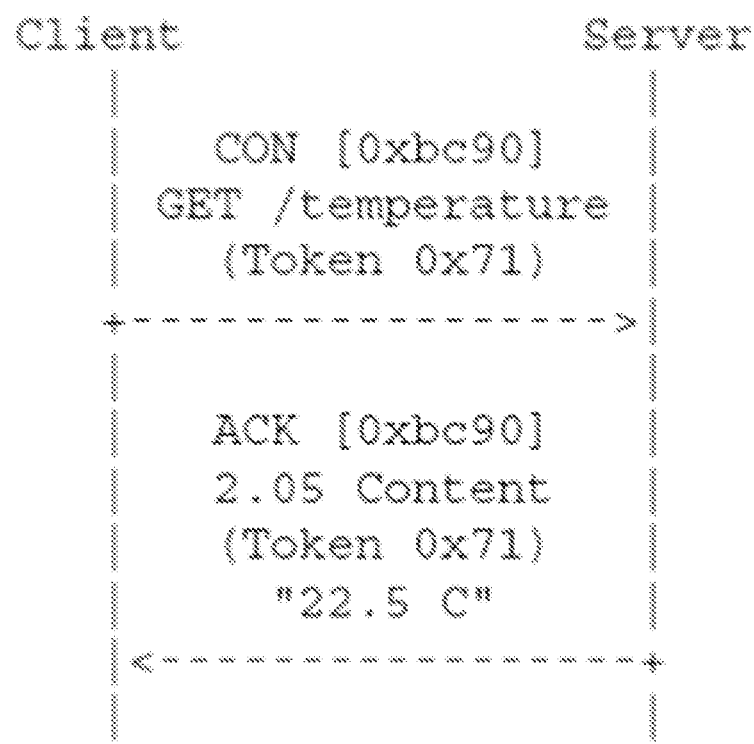
FIG. 5 shows another example message flow in accordance with the CoAP protocol.
Figure 6:
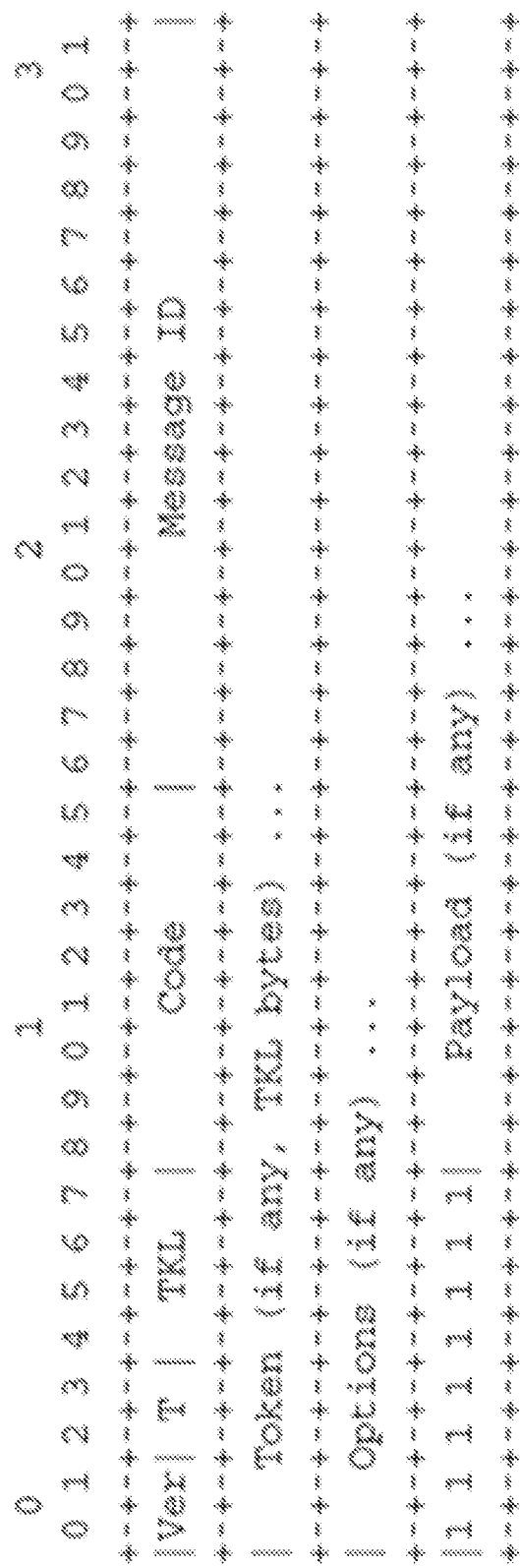
FIG. 6 illustrates a format of a CoAP message.
Figure 7:
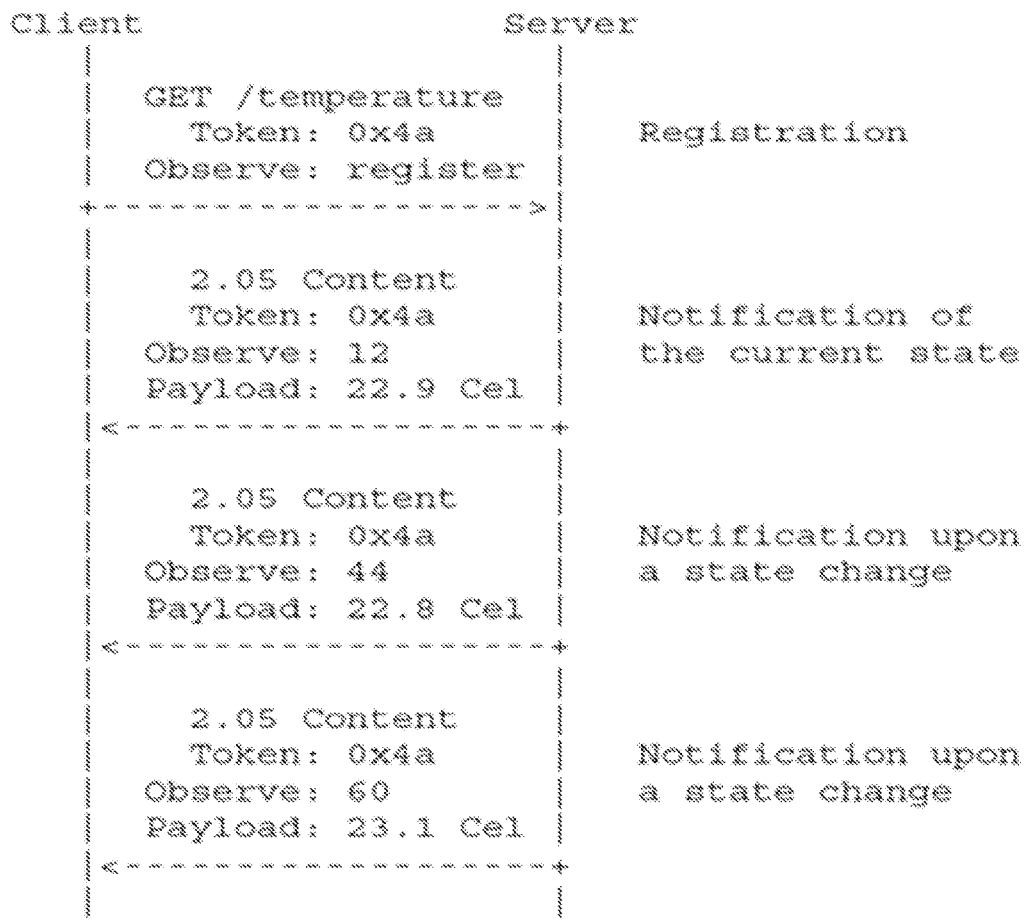
FIG. 7 shows yet another example message flow in accordance with the CoAP protocol.
Figure 8:
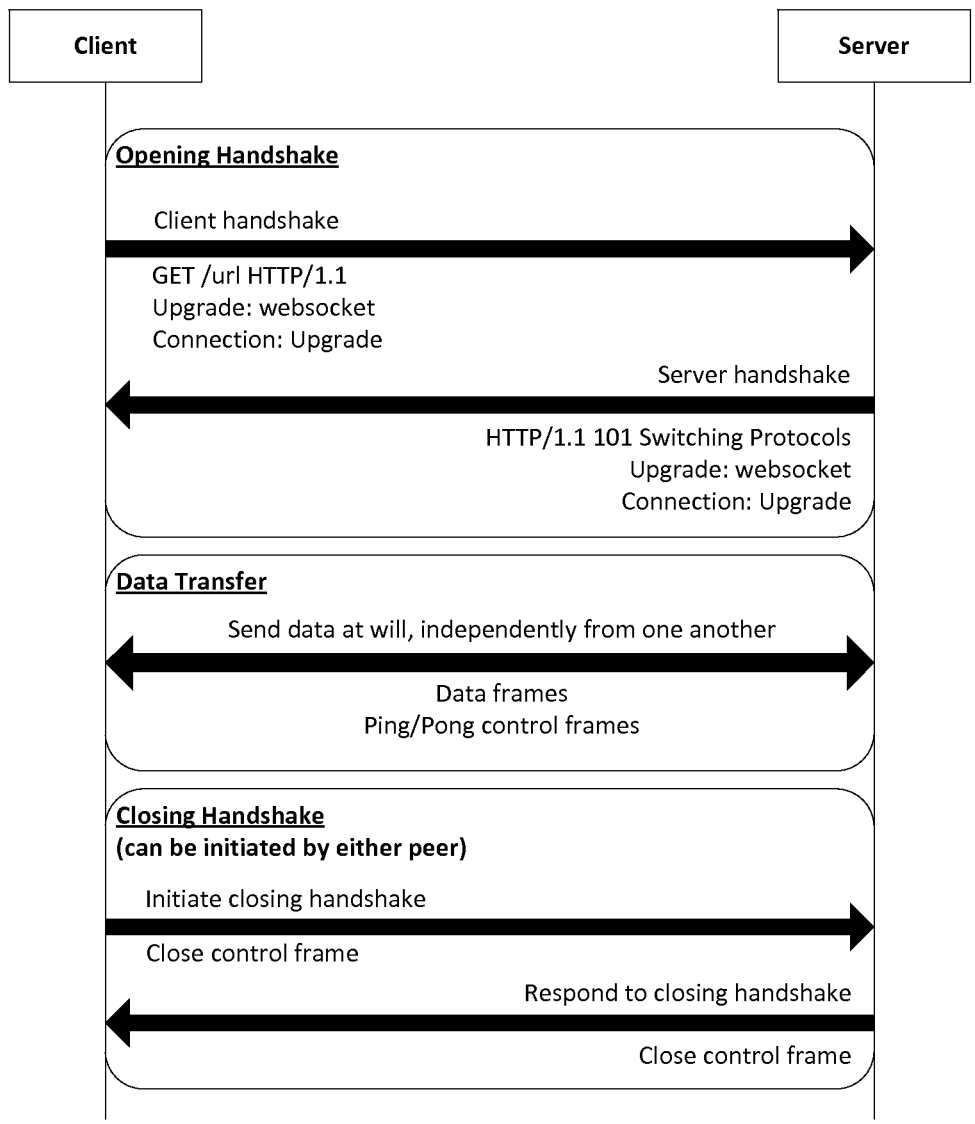
FIG. 8 illustrates basic WebSocket procedures.
Figure 9:
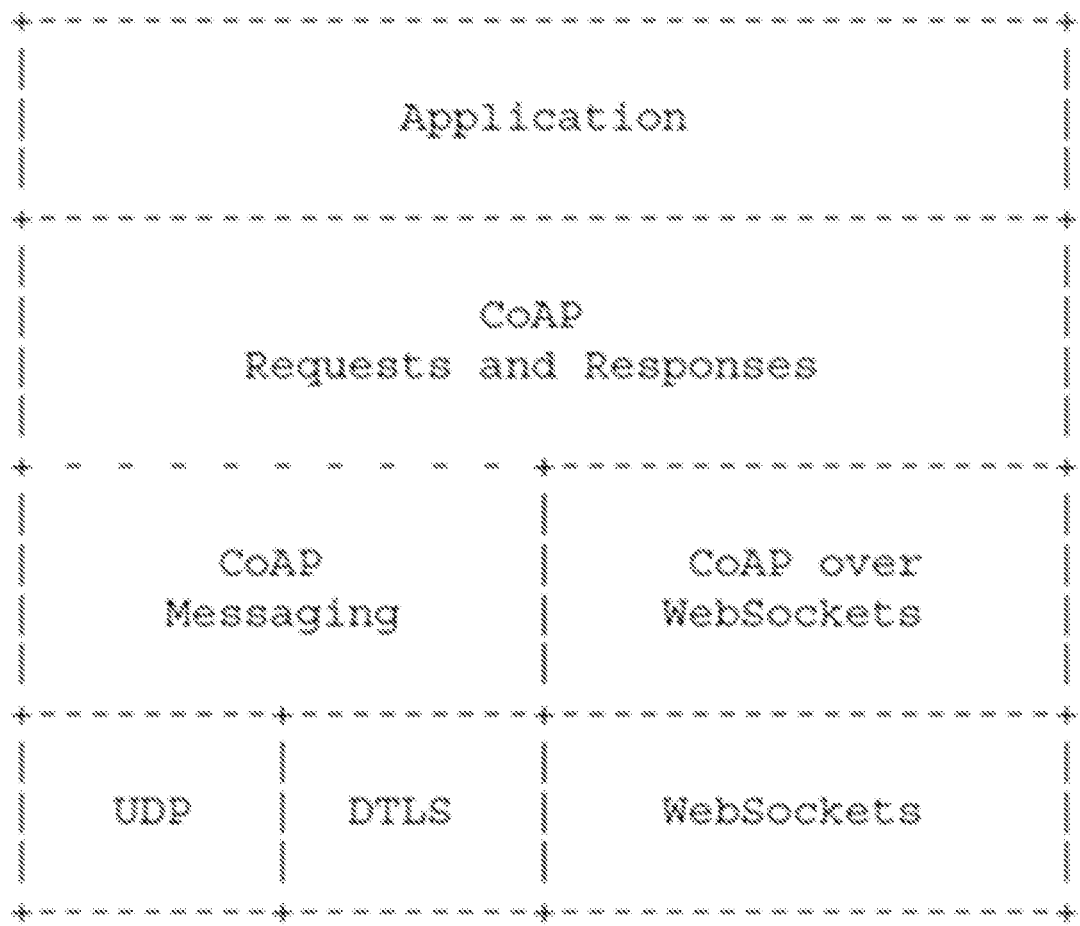
FIG. 9 illustrates a protocol layer diagram.

As used herein, the term "client" means the originating endpoint of a request, or the destination endpoint of a response, and the term "server" means the destination endpoint of a request, or the originating endpoint of a response. The term origin server is a server on which a given resource resides or is to be created. The term "endpoint" means an entity participating in a communication in accordance with a communication protocol, such as the CoAP protocol. The term "intermediary" means an endpoint that may act both as a server and as a client towards an origin server. The term "proxy" means a type of intermediary that may forward requests and relay back responses and may also perform caching, namespace translation, or protocol translation in the process. The term "forward-proxy" means an endpoint selected by a client to perform requests on behalf of the client, and executing any necessary translations; the client may select the endpoint via local configuration rules. The term "reverse-proxy" means an endpoint that stands in for one or more other server(s) and may satisfy requests on behalf of those servers, completing any necessary translations; unlike a forward-proxy, the client may not be aware that it is communicating with a reverse-proxy; a reverse-proxy may receive requests as if it was the origin server for the target resource. The term "stateful" refers to an interaction for which a computer or program keeps track of the state of interaction; one method of performing this task is by setting values in a storage field designated for that purpose. The term "stateless" refers to an interaction for which there is no record of previous interactions; each interaction request is handled based entirely on information that comes with it. For example, HTTP is a stateless protocol. Each request from a user for a Web page or URL results in the requested pages being served, but without the Web (HTTP) server remembering the request later. In other words, there is no recorded continuity. Each communication is discrete and unrelated to those that precede or follow. As used herein, "CoAP first device," "CoAP first node," "originator," and "client" are used interchangeably, as are "CoAP second device," "CoAP second node," "recipient," and "server". Also as used herein, the terms "connection" and "session" are used interchangeably.

CoAP was created to be a lightweight protocol for M2M applications. It is suited for short and independent transactions. For example, it may be used by a sensor to send a piece of data to a server, and after a period of time, an application retrieves the data stored by the sensor. The sending and receiving need not be correlated. CoAP works within a representational state transfer (REST) architecture, with components and entities described conforming to the constraints of a REST architecture (RESTful architecture). A RESTful architecture is described in terms of the constraints applied to components, entities, connectors, and data elements used in the architecture rather than in terms of physical component implementation or communications protocols used. Thus, the roles and functions of the components, entities, connectors, and data elements will be described. In a RESTful architecture, representations of uniquely addressable resources are transferred between entities. When handling resources in a RESTful architecture, there are basic methods that may be applied to resources, such as Create (create child resources), Retrieve (read the content of the resource), Update (write the content of the resource) or Delete (delete the resource).

Because UDP is connection-less, and CoAP is RESTful, there is no persistent communication connection (i.e., communication session) supported by the native CoAP/UDP architecture. However, there are use cases that would benefit from both a lightweight transport of UDP and some level of connection and stateful operations at the CoAP layer.

For example, in an eHealth system, the monitoring device on the patient can be very constrained, e.g. implanted inside the patient's body. Therefore, using HTTP/TCP is not feasible. The data sent from the device to the server is very time sensitive and needs to be correlated with the correct time stamps over a period of time. The content and transmission status of the messages also need to be kept. Having a CoAP connection can enable the CoAP server to track and correlate the CoAP messages in the context of a CoAP connection so the time correlation of the device readings can be obtained.

In another example, a remote monitor may switch from connection-less to connection mode when its operation is changed from "regular monitor" to "critical monitor". In the critical monitor mode, the order of the messages during a period of time is important.

The foregoing are use case examples for M2M applications. At the CoAP layer, there are cases that can benefit from the use of CoAP connections as well. For example, if the link goes down during a CoAP block transfer and only 2 out of 5 blocks are received. With a connection, when the link is later reestablished beyond the timeout period, it can continue with the 3rd block instead of starting over with the 1st block.

Disclosed herein are systems, methods and apparatus to define and support native CoAP connections between two or more devices using CoAP. For applications running on CoAP/UDP, having the support of connections at the CoAP layer can provide additional features for applications, such as stateful operations. Lack of connection support limits the usage of CoAP. Because CoAP might be used on top of different transports and some do not support connections, supporting connections at the CoAP level can ensure the feature of "connection" to be supported regardless of transports, thus providing the maximum flexibility. Support for connections at the CoAP layer can also relieve constrained applications to support application level sessions. CoAP connections can simplify an application's logic and implementation. Applications may be constrained as well and may not be able to support any connections/sessions. If connections are supported at the CoAP layer as described herein, for many Internet-of-Things (IoT) applications that only need simple connection information, they can rely on the CoAP layer connections, without the need for each application to support the same logic. For example, for many applications that need to track transactions every minute, if they use CoAP connections as disclosed herein, they do not need to implement such logic within each application. It reduces the overhead and duplication at applications.

With the techniques described herein, applications would no longer need to manage connections. Applications could simply configure the CoAP connections using the techniques described herein. Additionally, connection related information collected by the CoAP layer can be passed to applications.

In some use cases, an application may still choose to maintain application specific stateful information, such as using RESTful resources to record the information. Such information may be more permanent by nature since the resources can be kept for the application lifecycle. The proposed CoAP connection may provide more tentative connections for applications since the connections may be established and deleted more dynamically. In some examples, connections at both layers may work together complementarily.

The use of CoAP connections as disclosed herein may improve the transmission reliability and efficiency at the CoAP layer. For example, the CoAP protocol parameters, such as MAX_RETRANSMIT can be set to different values for different connections. A CoAP connection may also re-package the out of order datagrams and mitigate the drawbacks of UDP.

CoAP connections as disclosed herein may reduce signaling overhead compared to connection support at the application layer. For an application to setup a connection using confirmable messages, it requires one application request (need one CoAP request and one CoAP ACK) and one application response (need one CoAP response and one CoAP ACK). With the CoAP connections disclosed herein, the connection may be piggy-backed in the ACK so only one pair of CoAP request and ACK can establish a CoAP connection.

Figure 10:
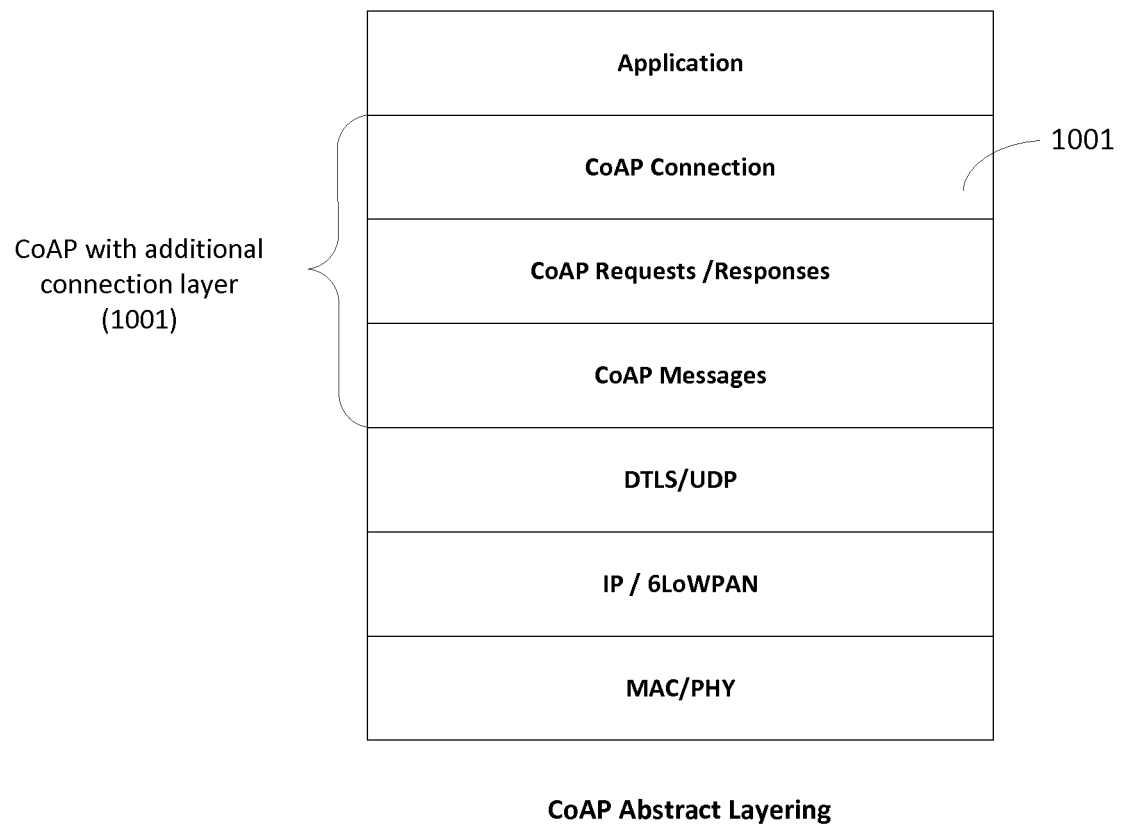
FIG. 10 shows one embodiment of CoAP abstract layering with the addition of a CoAP connection layer.

FIG. 10 shows one embodiment of CoAP abstract layering with the addition of a CoAP connection layer 1001. The CoAP connection layer 1001 may comprise a sub-layer above the CoAP Requests/Responses and CoAP messages layers. A CoAP connection as disclosed herein may have many characteristics. In general, a CoAP connection is a session established between a first device supporting CoAP (CoAP first device) and a second device supporting CoAP (CoAP second device). It may be initiated by the CoAP first device or the CoAP second device and involves at least one CoAP first device and one CoAP second device. A connection may involve multiple CoAP first devices with the same CoAP second device. Multiple CoAP messages may be exchanged between the CoAP first device and CoAP second device during the time a connection stays established. The CoAP first device and CoAP second device involved in the connection may keep the state of the connection. A CoAP first device may be involved in multiple connections with different CoAP second devices. A CoAP second device may be involved in multiple connections with different CoAP first devices. A CoAP proxy may be involved in and act on behalf of the CoAP first device or the CoAP second device in the connection. A CoAP connection may be uniquely identified by a connection ID. There may be zero, one, or multiple connections between a CoAP first device and second device. If multiple connections exist, they may have different contexts.

Datagram Transport Layer Security (DTLS), as shown in FIG. 10, is a protocol used to establish a lower layer session comparable to CoAP connections, and a DTLS session may coexist with a CoAP connection. A CoAP connection provides transaction level states, and DTLS provides a security session for encryption that does not maintain transaction level states. In some embodiments, context information within a CoAP connection and a DTLS session may or may not be partially shared. Also, in some embodiments, multiple CoAP connections may be within one DTLS session, i.e. multiple CoAP connection IDs may be mapped to the same DTLS session identifier.

UDP is assumed as the underlying transport protocol because the CoAP base protocol is bound to UDP. However, the CoAP connection mechanisms disclosed herein are independent of the underlying protocols, allowing support for CoAP over TCP as well.

Table 2 shows parameters that may be used to define and describe a CoAP connection. Not all shown parameters are required for each connection. The participants of a connection may exchange connection parameters, or they may not exchange parameters. In cases without exchanging of parameters, default settings may be used. In this way, a CoAP connection may be very lightweight.

TABLE 2

CoAP Connection Parameters

| Connection Parameters | Description |
|---|---|
| connectionID | The connectionID is a unique identifier that identifies the CoAP connection. If the CoAP client includes the connectionID, the CoAP server should check if this ID is unique before accepting the ID. If no connectionID is included in the request, the server should assign one and the client should verify that it is unique. In a common case, a connection is uniquely identified by a connectionID. However, if no connectionID is assigned for a connection, it means that the first device and the second device agree to have one connection at a time only between them. This provides a very simple form for connections. This specification's example embodiments use connectionIDs to illustrate how CoAP connections work in common cases. |
| status | The status parameter may have the following values: Activated, Deactivated, Deleted. When a connection is established, the default status is "Activated", meaning that the endpoints start to build the connection states and contexts. However, the connection may be "Deactivated", meaning that the connection is still established, but the endpoints stop keeping the state until the connection is activated again. The "Deleted" status is a temporary status used in the connection release operation. |
| type | The type parameter may be persistent or semi-persistent. The default value is persistent. A persistent CoAP connection exists until released explicitly. A semi-persistent CoAP connection is released automatically. For example, a semi-persistent CoAP connection may end when a timer expires. |
| durationTime | The durationTime parameter defines the duration of a semi-persistent connection by time interval. |

TABLE 2-continued

CoAP Connection Parameters

| Connection Parameters | Description |
|---|---|
| durationOperation | The durationOperation parameter defines the duration of a semi-persistent connection by number of operations. For example, a connection may exist for ten consecutive operations between the first device and the second device. The "transactionFilter" in the next row can further define what kinds of methods may be counted. If both durationTime and durationOperation are present, the condition that happens first will trigger the release of the semi-persistent connection. |
| transactionFilter | The transactionFilter parameter filters what kinds of transactions will be included in the connection. The kinds of transactions include GET, POST, PUT, DELETE, or a combination thereof. The transactionFilter may also include certain CoAP Option values. For example, a connection may only include GET operations and other operations will not be considered as part of the connection. If transactionFilter is used together with "durationOperation", it defines when a semi-persistent connection will be released. If no "durationOperation" is defined, it is for a persistent connection. If no transactionFilter parameter is provided, all transactions between the endpoints involved in the connection are included in the connection. |
| proxyMode | The proxyMode parameter indicates whether the first device accepts transparent mode, aggregation mode, or relay mode. The default mode is "transparent mode". Proxies are described below in further detail. |
| participants | The participants parameter is a list of URIs of the first device(s) and second device involved in the same connection. By default a CoAP connection involves two participants, the originator of the connection and the recipient of the request. A connection may also involve multiple first devices and one second device. If the "proxyMode" is set to "relay mode", then the proxy is also the participant. |
| context | The context parameter provides a list of context information to be collected for the connection. Examples of contexts include the accumulated number of messages, the CoAP sequence number of messages, the methods of the messages, the content types, the content, the failed messages, number of retransmissions, CoAP header Option values, etc. If no context information is provided for a connection, the participants of the connection will use the default setting. The default setting includes the method of messages exchanged during the connection, the status of the messages (i.e. successful or unsuccessful), and any content included in the messages. Both the CoAP first device and second device keep the context information. If the "proxyMode" is set to "relay mode", then the proxy is also a participant of the connection and may additionally keep the context. |
| contextSharing | The contextSharing parameter indicates if the originator of the connection allows sharing of its connection information with other endpoints within the same connection, or it can share with other endpoints not within the same connection. The default setting is "no-any" which means no context sharing at all. Other values may include "yes-sameconnection", "yes-any", or "no-other". |
| protocolParameters | The protocolParameters parameter is a list of CoAP protocol parameters participants can exchange to be used for different connections. If no protocolParameters are exchanged, the default protocol parameter values are used. The parameters are defined in the current CoAP base protocol. Two examples of such parameters are PROCESSING_DELAY and MAX_RETRANSMIT. |
| correlationIDs | The correlationIDs parameter is a list of ID(s) that associate a CoAP connection with other connections or sessions. For example, it may include a Service Layer Session identifier and/or a DTLS session identifier. |

Example Graphical User Interface

Figure 11:
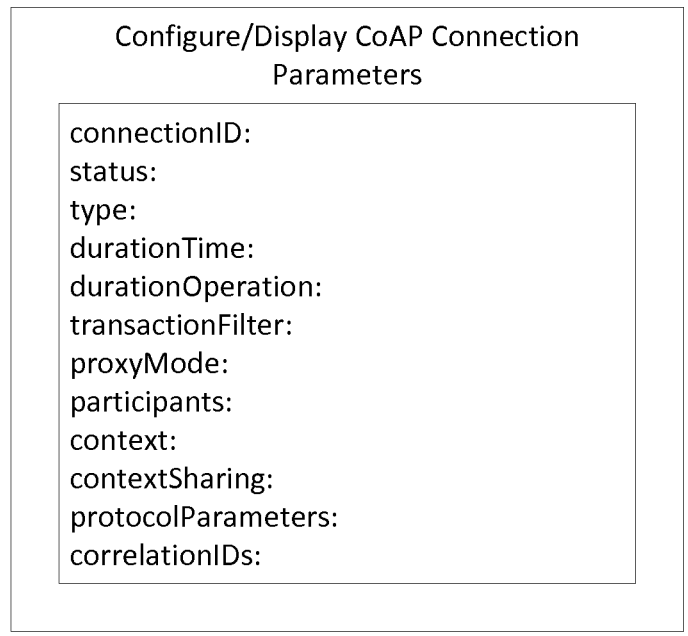
FIG. 11 shows an example graphical user interface (GUI) in accordance with an example embodiment.

To provide a convenient avenue for configuring any or all of the aforementioned parameters, an embodiment may include a graphical user interface. For example, the graphical user interface (GUI) may allow a user to input desired values for the parameters during protocol setup and deployment. One embodiment of such an example GUI is shown in FIG. 11. Depending on the specific context or application scenario, users may use such a GUI to configure and/or display CoAP connection related parameters, such as connectionID, status, type, durationTime, durationOperation, transactionFilter, proxyMode, participants, context, contextSharing, protocolParameters, and correlationIDs. The GUI may be implemented on any of the clients, servers, and/or proxies described and illustrated herein.

CoAP Connection

FIGS. 12-16, 18-20, 22-25, 27, and 28 (described hereinafter) illustrate various embodiments of methods and apparatus for enabling CoAP connections. In these figures, various steps or operations are shown being performed by one or more clients, servers, and/or proxies. It is understood that the clients, servers, and proxies illustrated in these figures may represent logical entities in a communication network and may be implemented in the form of software (i.e., computer-executable instructions) stored in a memory of, and executing on a processor of, a node of such network, which may comprise one of the general architectures illustrated in FIG. 29C or 29D described below. That is, the methods illustrated in FIGS. 12-16, 18-20, 22-25, 27, and 28 may be implemented in the form of software (i.e., computer-executable instructions) stored in a memory of a network node, such as for example the node or computer system illustrated in FIG. 29C or 29D, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 29C and 29D, respectively) of the node under control of the processor of the node and the computer-executable instructions (e.g., software) that it executes.

Figure 12:
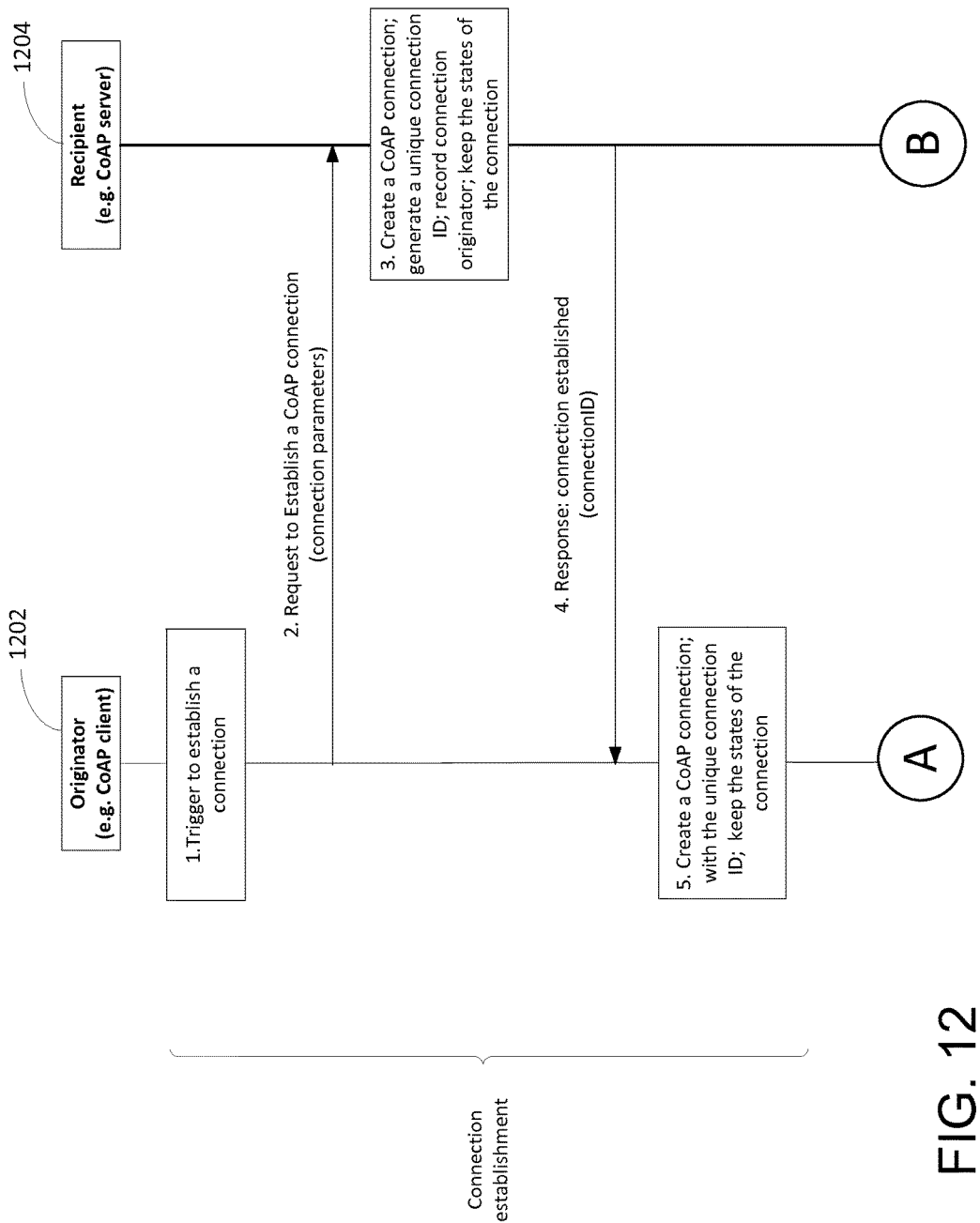
FIGS. 12 and 13 illustrate one embodiment of a method for establishing, operating, and then releasing a CoAP connection.
Figure 13:
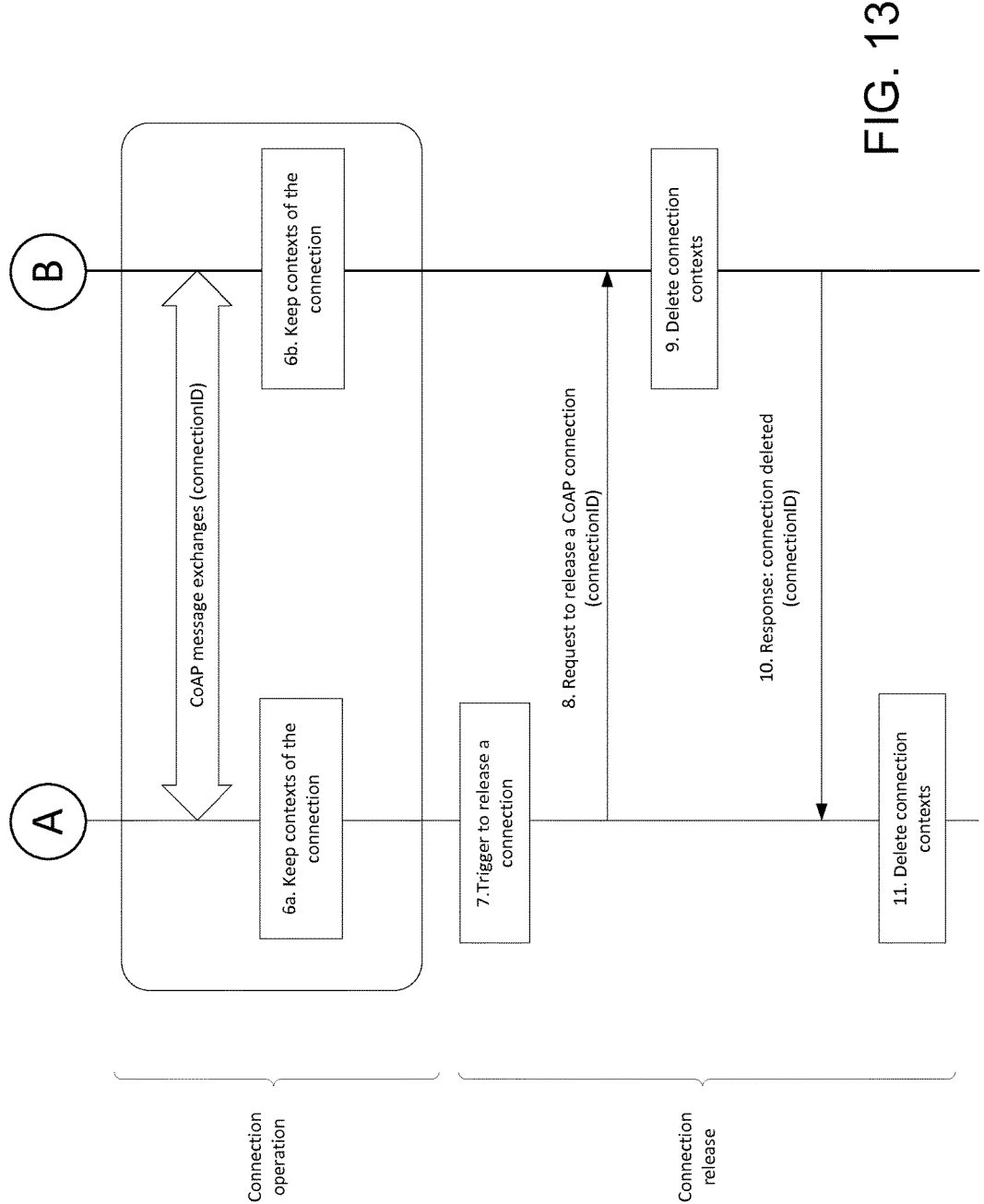

FIGS. 12-13 illustrate one embodiment of a method for establishing, operating, and then releasing a CoAP connection. To ensure handshaking between a CoAP first device and CoAP second device, a CoAP confirmable message (CON) may be used for connection establishment and release. Both piggy-backed responses (Response is piggy-backed with Acknowledgement message (ACK)) and separate responses (ACK and Response are sent separately) may be used. For clarity, the call flow in FIGS. 12-13 shows only CoAP piggy-backed responses.

At step 1, the originator 1202 triggers the establishment of a CoAP connection. The triggers may come from applications. When an application makes a request, it may trigger the CoAP connection mechanism to establish a connection. Some applications may always require a CoAP connection. Some applications may switch from connection-less status to requiring a connection. One such example is where a remote monitor switches from "regular monitor" to "critical monitor" mode.

At step 2, the originator sends a CoAP Request message. In the Request message, it indicates the need to establish a CoAP connection, and it may also include the connection parameters as defined in Table 2. Different embodiments for supporting CoAP connections using the CoAP base protocol are discussed subsequently herein.

At step 3, upon receiving the CoAP Request message indicating the need for a CoAP connection, the recipient 1204 creates an instance for the CoAP connection. The instance may be, for example, a data structure that records the connection parameters as defined in Table 2. The recipient generates a connectionID that should be unique for the connection between the originator and recipient.

At step 4, the recipient sends a CoAP Response message to the originator, including the connectionID. The originator should verify the uniqueness of the connectionID, which is an indication that the connection has been created on the recipient side. The Response message may contain agreed connection parameters. If no parameters are included, it means all parameters are agreed among the entities.

At step 5, upon receiving the Response message, the originator also creates an instance for the same CoAP connection using the same connectionID the recipient used.

At steps 6a and 6b, the CoAP connection is already established. If "transactionFilter" is not set, all CoAP messages exchanged between the client and the server are part of the CoAP connection. If "transactionFilter" is set, only those messages of the kind filtered-in belong to the connection. Depending on what is defined in the "context" parameter, both the originator and the recipient may record the context information for the connection in the connection instance.

During the connection, the parameters of the connection may be updated by the originator or the recipient. For example, the connection status may be changed from "Activated" to "Deactivated". Deactivation allows a party to the connection to deactivate the connection, but maintain the state of the connection. Such an occurrence might take place if, for example, the originator is busy or does not need information for a period of time. Continuing with an eHealth example, if there is a period of time that health data does not need to be monitored, the connection may be deactivated until ready to collect data again.

At step 7, in the case of a semi-persistent connection, the connection is released by the originator. For example, in a connection release based on duration, meaning the originator set a timer for durationTime or a counter for durationOperation when it received the Response message in step 4, the expiration of the timer triggers the originator to initiate a CoAP Request message to release the connection. The recipient may also keep a timer or counter, and in case of exception that a connection was not released by the originator, the recipient may delete the instance of the connection.

For a persistent connection, the connection may need to be explicitly released. FIGS. 12-13 show a case where the originator initiates release. However, either the originator or the recipient may initiate the CoAP request to release the connection. For example, the recipient may accept establishment of a connection, and after a period of time, the recipient becomes overloaded because the recipient is constrained. The recipient then needs to release the connection.

At step 8, the originator sends a CoAP Request, indicating the release of a connection. Different methods to release a connection are proposed herein below. The connectionID may be included in the Request.

At step 9, the recipient deletes the connection instance identified by the connectionID.

At step 10, the recipient indicates, in the Response message, the successful deletion of the connection identified by the connectionID. Different methods to include such information are proposed herein below.

At step 11, upon receiving the successful response from the server, the originator also deletes the connection instance under the same connectionID.

Figure 14:
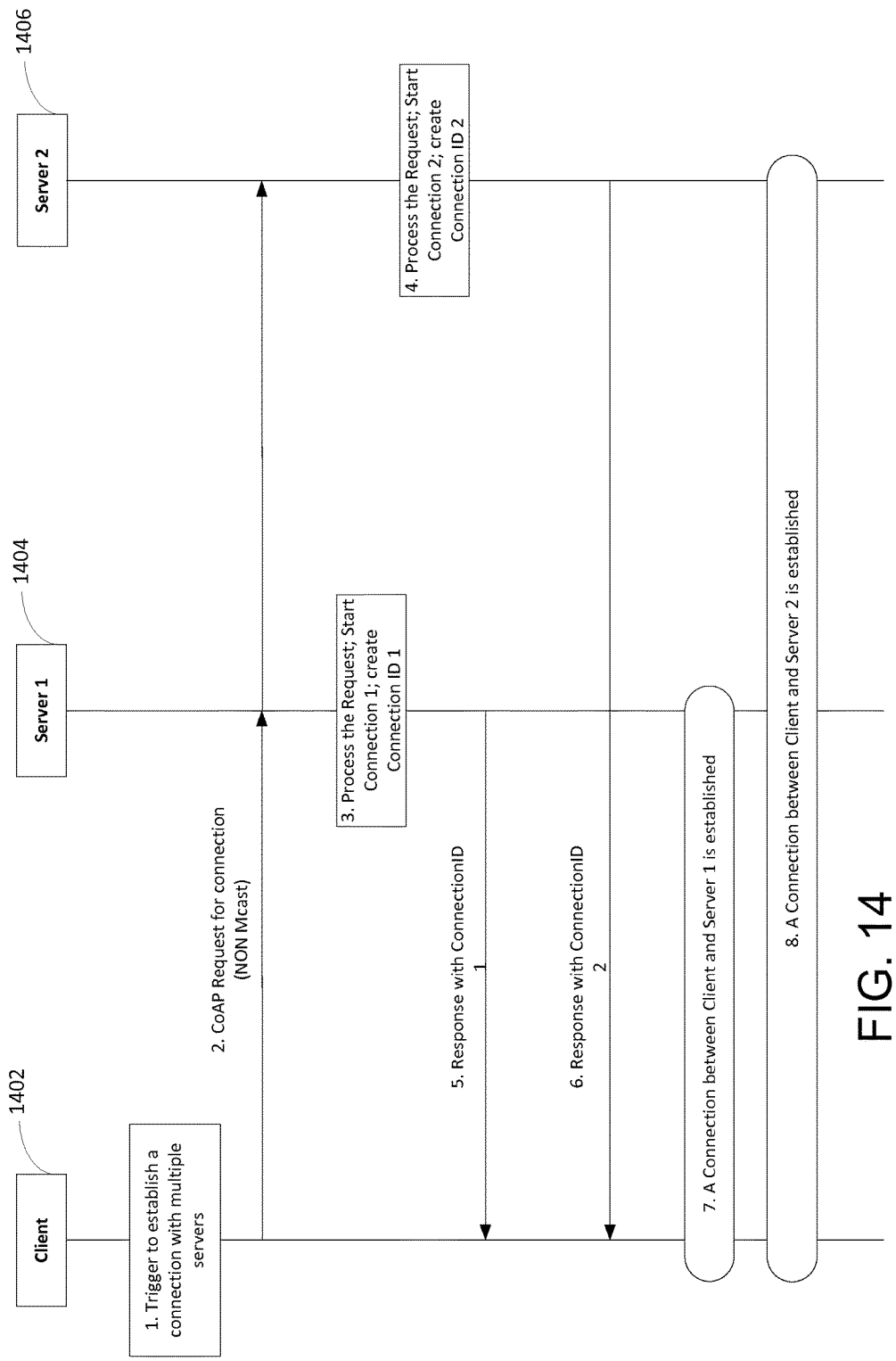
FIG. 14 illustrates one embodiment of a method using a Non-confirmable multicast message to establish CoAP connections.

CoAP supports multicast because it uses UDP as its transport protocol. In some embodiments, multicast may be used to support CoAP connections. FIG. 14 illustrates one embodiment of a method in which a CoAP first device (i.e., client 1402) uses a Non-confirmable multicast message (step 2) to establish two connections with two different second devices, named server1 (1404) and server2 (1406). Each second device will allocate a different connectionID and send back responses separately to the first device (steps 3, 5 and 4, 6, respectively). As a result, the first device has two separate connections, one with server1 (shown at step 7) and one with server2 (shown at step 8). In the Request (step 2), the first device indicates the participants using the connection parameter, and the first device may reject a Response if it comes from a second device that is not the anticipated participant.

In some embodiments, a keepalive mechanism could be used at the CoAP layer to further support CoAP connections. A keepalive mechanism is a mechanism for two communicating nodes (or entities) to inform each of the other's online or existence status to make sure that connectivity between the two nodes is still on and alive. It is usually implemented in a manner in which a first node sends a Keepalive Message to a second node. The Keepalive Message could contain nothing more than information telling the second node that the first node is currently online or alive; alternately, the Keepalive Message can contain more rich information such as the time duration for keeping alive until a next time of transmitting another Keepalive Message. In embodiments in which a keepalive mechanism may be used at the CoAP layer, a new CoAP Option may be used to indicate that keepalive is supported by an endpoint. In the Option value, the interval of the keepalive message may be provided. A special well-known directory or URI (e.g., /coap/keepalive) may be used for the keepalive messages. The CoAP client may send PUT requests to the special URI for keepalive messages. Note that CoAP connections would not rely on the keepalive messages to work. However, the keepalive messages at the CoAP layer may be used for purposes other than CoAP connections. For example, if keepalive messages always go to a special URI, then the access network may use Deep Packet Inspection (DPI) to determine when keep alive messages are sent. Based on these observations, the access network may tune lower-layer parameters, such as Discontinuous Reception (DRX) cycles in a 3GPP network.

CoAP Connection Method Using Restful Messages

Figure 15:
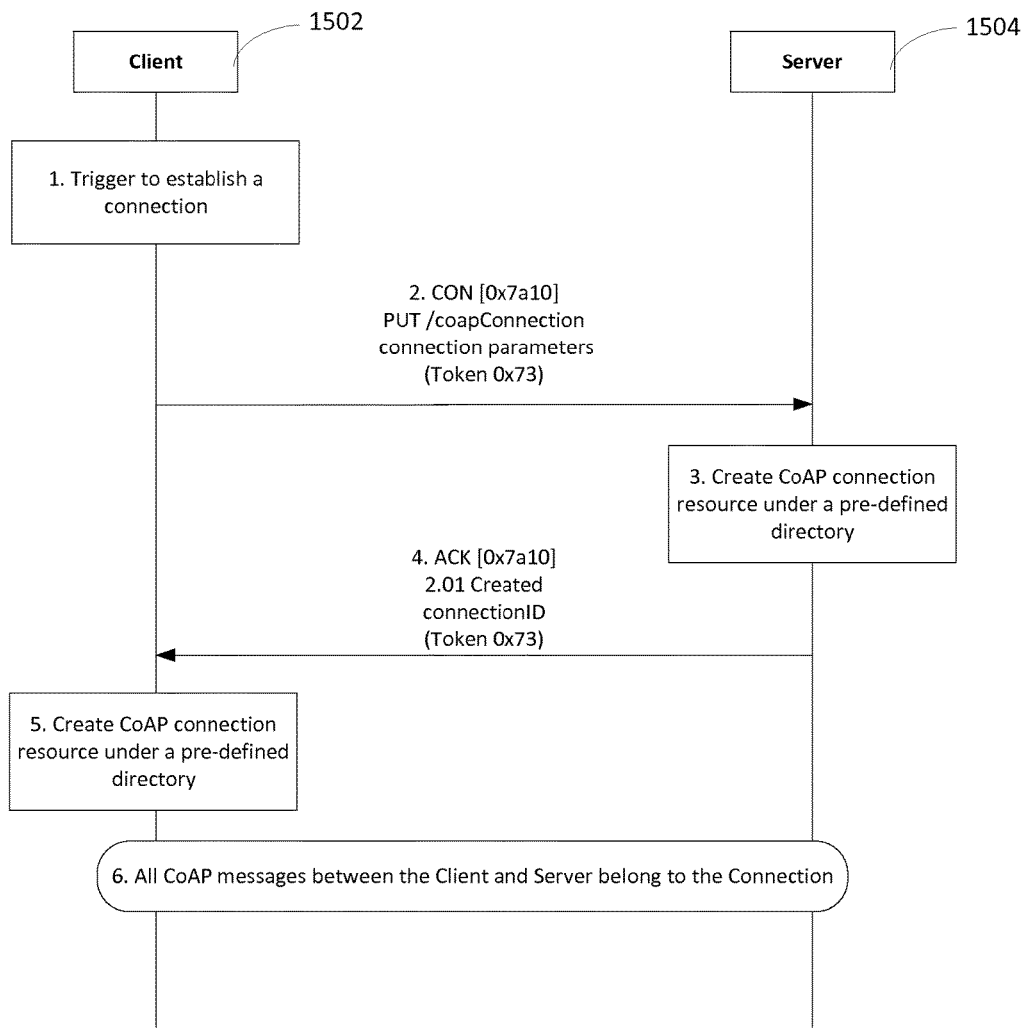
FIG. 15 illustrates one embodiment of a method for establishing CoAP connections using CoAP methods, such as PUT and DELETE.

FIG. 15 illustrates one embodiment of a method for establishing CoAP connections using CoAP methods, such as PUT and DELETE. In this embodiment, a well-known directory or URI (e.g., /coapConnection) may be used for storing dedicated resources for CoAP connections. Each resource may be identified by its unique connectionID, such as "/coapConnection/connection873" or "/coapConnection/connection374". The well-known URI scheme proposed in RFC 5785 may also be used. The path of the coapConnection resource may be, for example "/.well-known/coapConnection".

and the states of operations are stored under the well-known resources created on both the client and server sides. The connectionID should be included in the subsequent messages. How the connectionID is included in subsequent messages may vary, but one approach includes the connectionID in the message payload.

Figure 16:
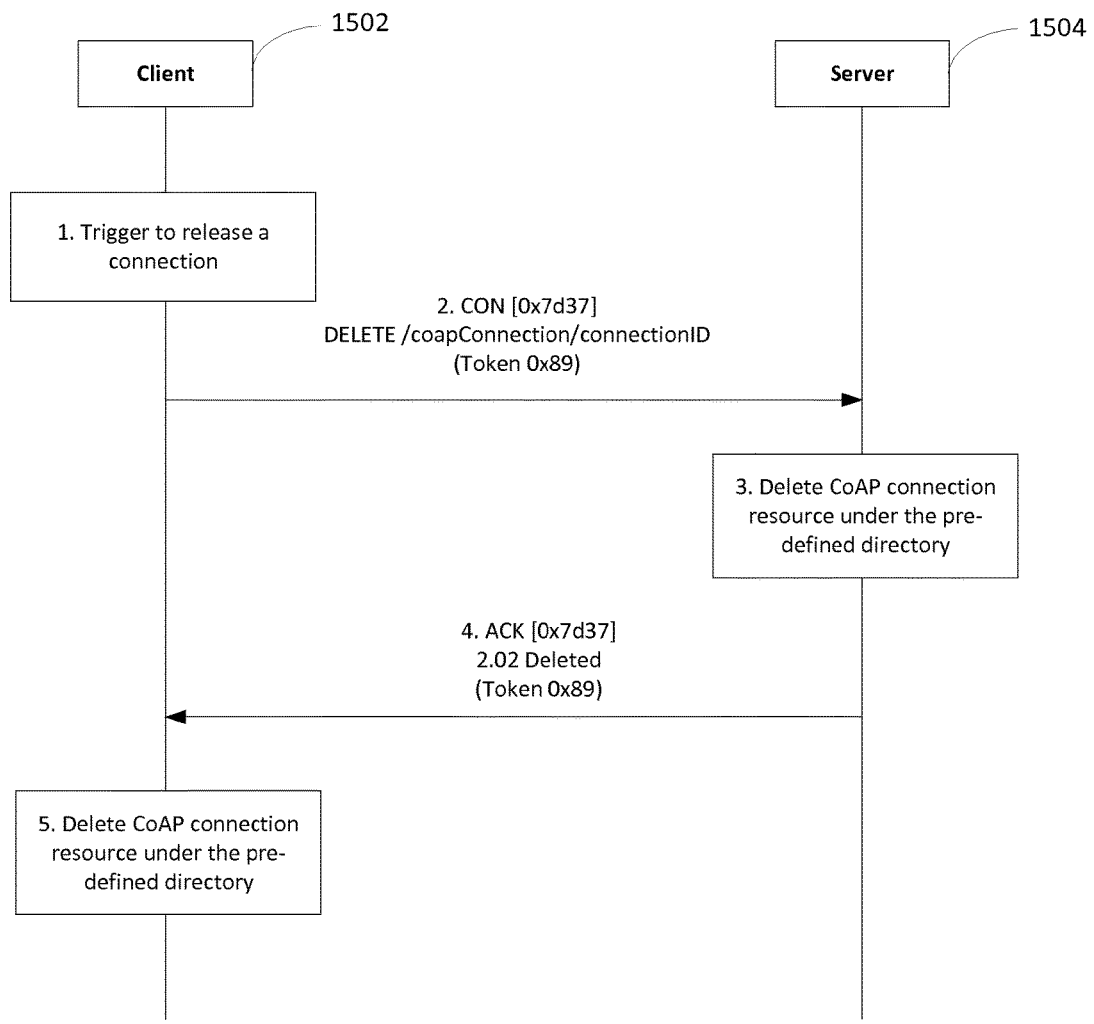
FIG. 16 illustrates a method for releasing a CoAP connection using a DELETE method, in accordance with the embodiment of FIG. 15.

FIG. 16 illustrates a method for releasing the CoAP connection using DELETE, in accordance with the present embodiment. At step 1, the client triggers the tear down of the connection.

At step 2, the CoAP DELETE method is used to delete the connection. The client specifies which connection to delete by providing the connectionID.

At step 3, the server verifies that the connection exists and deletes the resource under /coapConnection/connectionID, where connectionID matches the connection to be deleted.

At step 4, the server sends the response back, indicating the successful deletion of the connection resource on the server side.

At step 5, once the client receives the response from the server, it should also delete the resource corresponding to the same connection on the client side.

CoAP Connection Method Using CoAP Option

Figure 17:
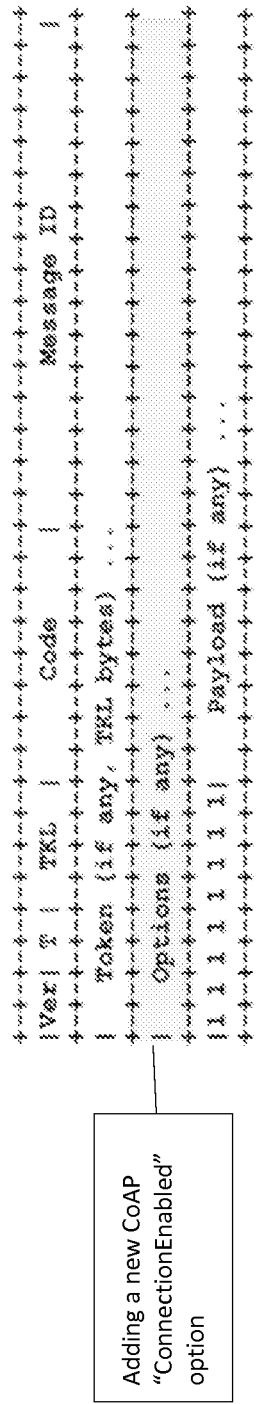
FIG. 17 illustrates one embodiment of a method for supporting CoAP connections using a new CoAP Option.

FIG. 17 illustrates one embodiment of a method for supporting CoAP connections using a new CoAP Option to do so. In this embodiment, the CoAP option may be denoted "connectionEnabled", as illustrated in FIG. 17.

Table 3 sets forth one embodiment of a definition for a new CoAP Option—"connectionEnabled"—that may be added to the CoAP protocol to provide support for CoAP connections. Note that assigning No. "61" to this new Option is presented solely for purposes of example and should not be construed to limit the Option to this specific number.

TABLE 3

| CoAP Option | | | | | | | | |
|---|---|---|---|---|---|---|---|---|
| No. | C(ritical) | U(nsafe) | N(oCachekey) | R(epeatable) | Name | Format | Length | Default |
| 61 | x | | X | | Connection Enabled | string | 0-1 | (none) |

Referring to FIG. 15, at step 1, the CoAP client 1502 triggers the establishment of a connection.

At step 2, the CoAP PUT method is used to establish a connection. It addresses the well-known address /coapConnection that resides at the CoAP layer on the server. The client fills in the parameters as described above.

At step 3, after receiving the PUT request, the server 1504 creates a resource under /coapConnection for the specific connection. If the client has not assigned a connection ID, the server will assign one. The server may verify that the ID is unique between the client and the server.

At step 4, upon creating the connection resource, the server sends the ACK and response back with the connectionID.

At step 5, after receiving the successful response from the server, the client also creates a corresponding resource with the same connectionID under the /coapConnection directory at its CoAP layer.

Figure 18:
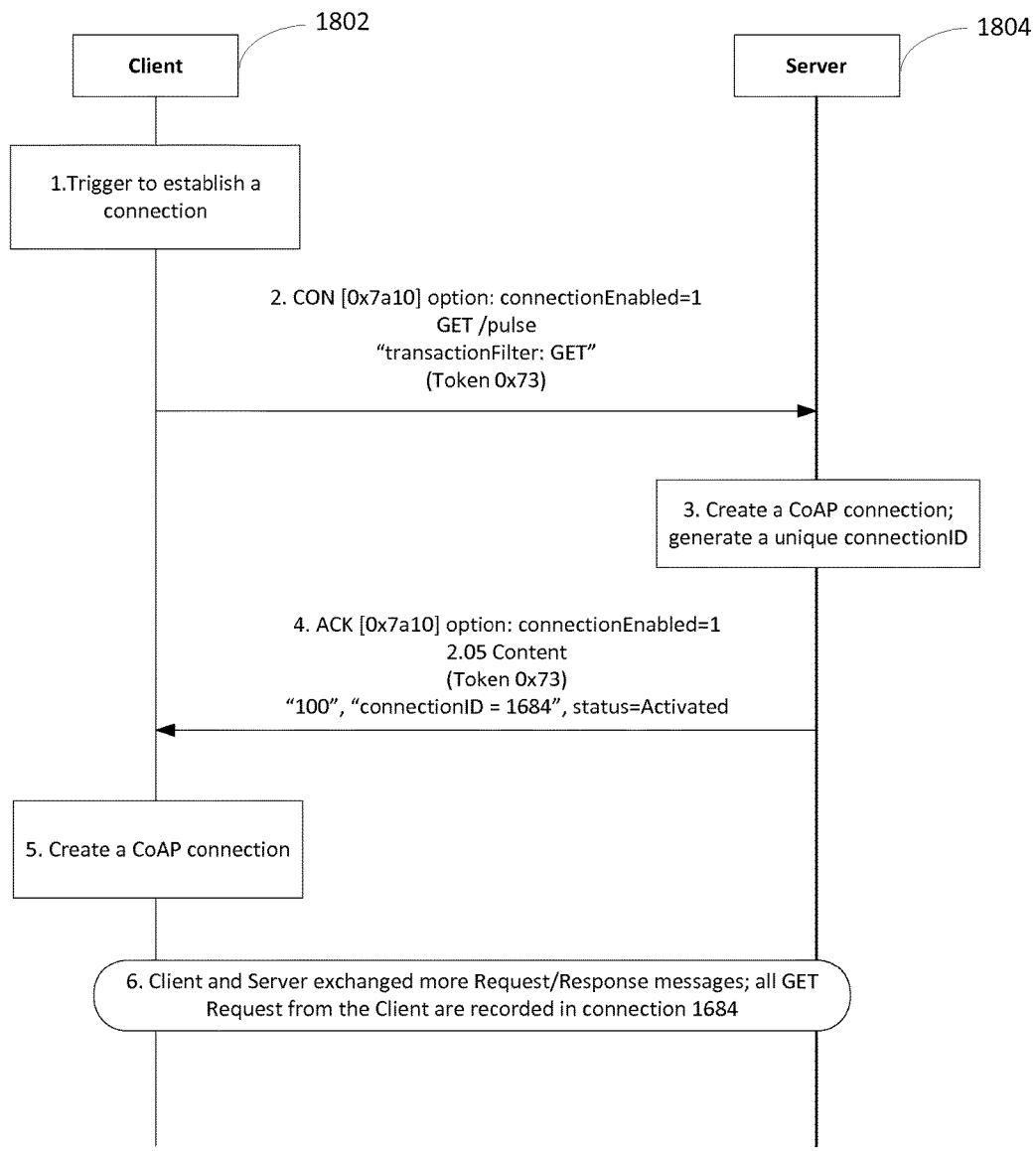
FIG. 18 further illustrates the embodiment of FIG. 17.

At step 6, all CoAP transactions between the client and server belong to the connection just created (unless filtered), FIG. 18 illustrates one embodiment of a method for establishing a CoAP connection using the new CoAP Option defined in Table 3.

At step 1, the CoAP client 1802 triggers the establishment of a CoAP connection.

At step 2, the "connectionEnabled" option within the CoAP request is used to establish a connection. In this specific example, the connection request is "connectionEnabled=1". It may be piggy-backed with a normal GET request, and the "transactionFilter" parameter may be included in the payload of the message. Other connection parameters may be included, but are not shown in the figure. Here, continuing the non-limiting eHealth example, the GET request may be a request for a patient's pulse.

At step 3, the server 1804 creates a CoAP connection. By receiving the "connectionEnabled" Option, the server looks at the payload for the connection parameters.

At step 4, the server acknowledges the successful establishment of the connection by generating and sending a connectionID. Notice that, in this example, the content of the GET request is also sent with the connectionID. In this example, the pulse is "100" beats per minute.

At step 5, the client creates the connection instance under the same connectionID.

At step 6, due to the "transactionFilter" in this example, only GET requests and responses exchanged between the client and server are considered to be included in the connection.

Figure 19:
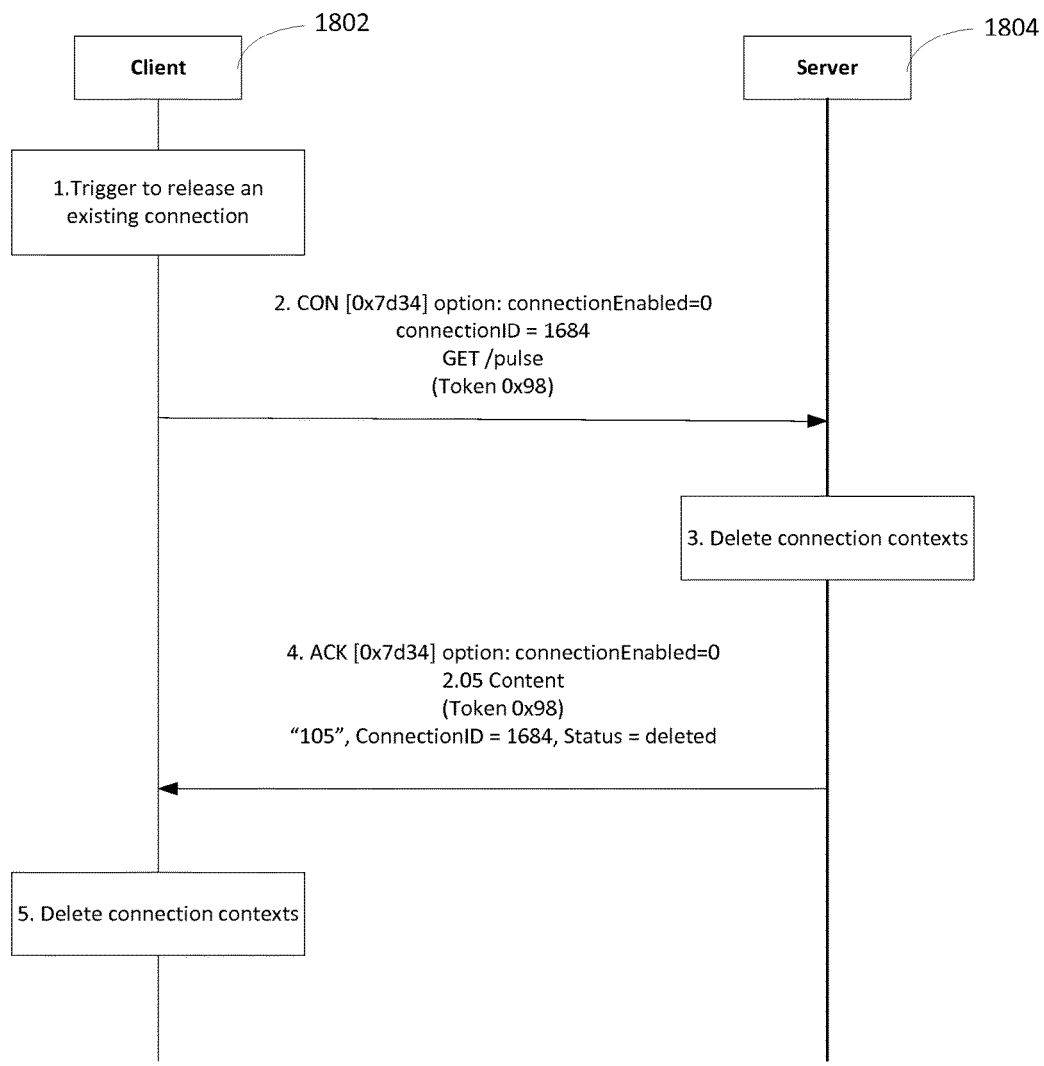
FIG. 19 illustrates a method for releasing a CoAP connection in accordance with the embodiment of FIGS. 17 and 18.

FIG. 19 illustrates a method for releasing a CoAP connection in accordance with this embodiment. As shown, to release the connection in this example, the client may send a request with "connectionEnabled=0" and provide the connectionID (step 2). This release operation is piggy-backed with a regular GET request, in this example. At step 3, the server deletes the connection resource (i.e., context) and responds with an ACK. Upon receiving the ACK, the client may also delete any context that it has stored for the released connection.

CoAP Connection Method Using CoAP Code Header

Figure 20:
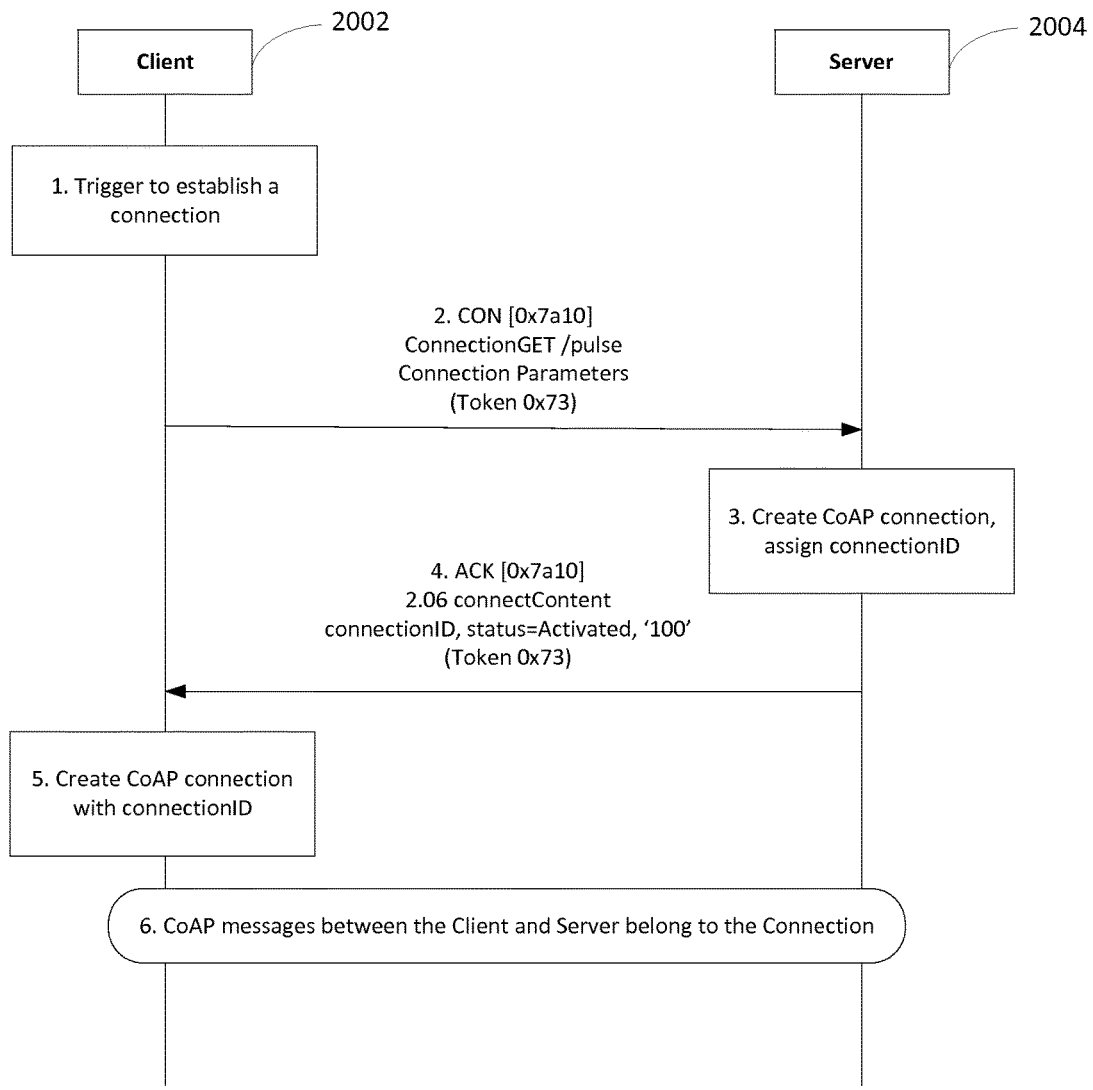
FIG. 20 illustrates one embodiment of a method for establishing CoAP connections using an expansion of the existing CoAP Code in a CoAP message header.

FIG. 20 illustrates one embodiment of a method for establishing CoAP connections using an expansion of the existing CoAP Code in a CoAP message header. In this approach, the CoAP Code in the CoAP message header may be expanded to support CoAP connections. The connection parameters may be included at the beginning of the payload. As shown in Table 4, new method codes (e.g., new method codes 0.05, 0.06, 0.07, and 0.08) may be used to support connections. The operations related to CoAP connections may be piggy-backed with regular CoAP messages, using the specific codes starting with "connection" and with the connection parameters explicitly included. A client sending a request with the special code starting with "connection" thereby indicates a request to establish a connection. All subsequent messages within the connection may be sent using the "connection" codes. These messages are for the current CoAP transactions, such as GET and PUT. If there are also connection parameters piggy-backed onto the request, the existing connection may be updated using these parameters. Unless specified by a timer, the connection may be explicitly released when the client sends a request with a non-"connection" code.

TABLE 4

Expanded CoAP Method Codes to Support CoAP Connection

| Code | Name |
|------|------|
| 0.01 | GET |
| 0.02 | POST |
| 0.03 | PUT |
| 0.04 | DELETE |
| 0.05 | connectionGET |
| 0.06 | connectionPOST |
| 0.07 | connectionPUT |
| 0.08 | connectionDELETE |

Table 5 shows proposed response codes for connections. When the server uses a response code starting with "connection", it indicates that it acknowledges the connection request, and the first byte in the payload may be the connectionID. The proposed response codes are correlated to the response codes in CoAP base protocol. For example, the "connectionCreated" code functions as the "Created" code functions, except that it is used for CoAP connections.

TABLE 5

Expanded CoAP Response Codes to Support CoAP Connections

| Code | Description |
|------|-------------|
| 2.01 | Created |
| 2.02 | Deleted |
| 2.03 | Valid |
| 2.04 | Changed |
| 2.05 | Content |
| 2.06 | connectionCreated |
| 2.07 | connectionDeleted |
| 2.08 | connectionValid |
| 2.09 | connectionChanged |
| 2.10 | connectionContent |

With reference to the method steps illustrated in FIG. 20, at step 1, a client 2002 triggers the establishment of a connection.

At step 2, instead of a regular CoAP GET request with code 0.01, the client sends a connectionGET by specifying code 0.05 in the Code field in the CoAP header. The Connection Parameters are carried in the message payload.

At step 3, the server 2004 creates the connection and assigns a connectionID to the connection.

At step 4, the server includes the connectionID in the payload of the response message, which has the new proposed response type of "connectionContent". The server may also include an explicit indication of the status of the connection as Activated as well as the content of the GET request in the response message.

At step 5, upon receiving the successful response message, the client creates a connection context with the same connectionID.

At step 6, messages exchanged between the client and server belong to the connection unless they are filtered out using transactionFilter. These messages should use the proposed "connection" methods. Both the client and server may keep connection contexts, such as those defined in Table 2.

CoAP Connection Method Using CoAP Token Header

Figure 21:
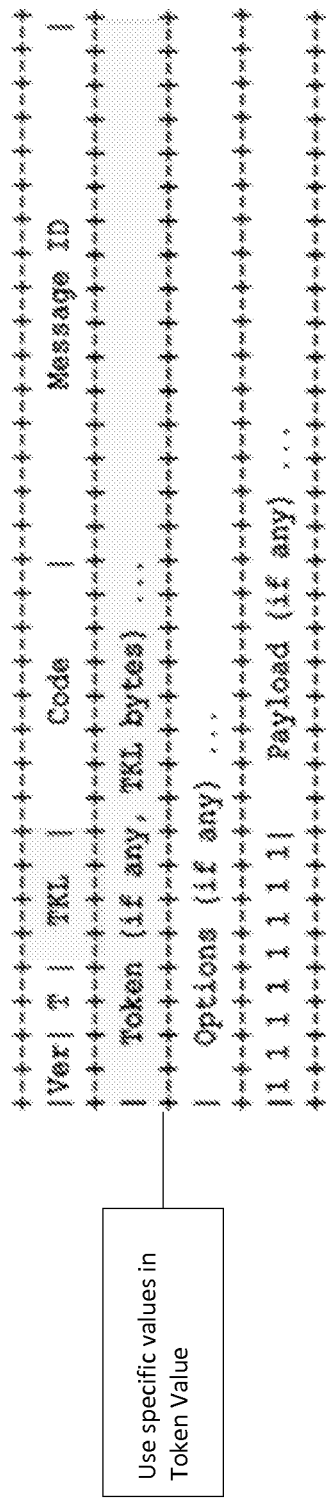
FIG. 21 shows the location of the TKL and Token fields in a CoAP message.
Figure 22:
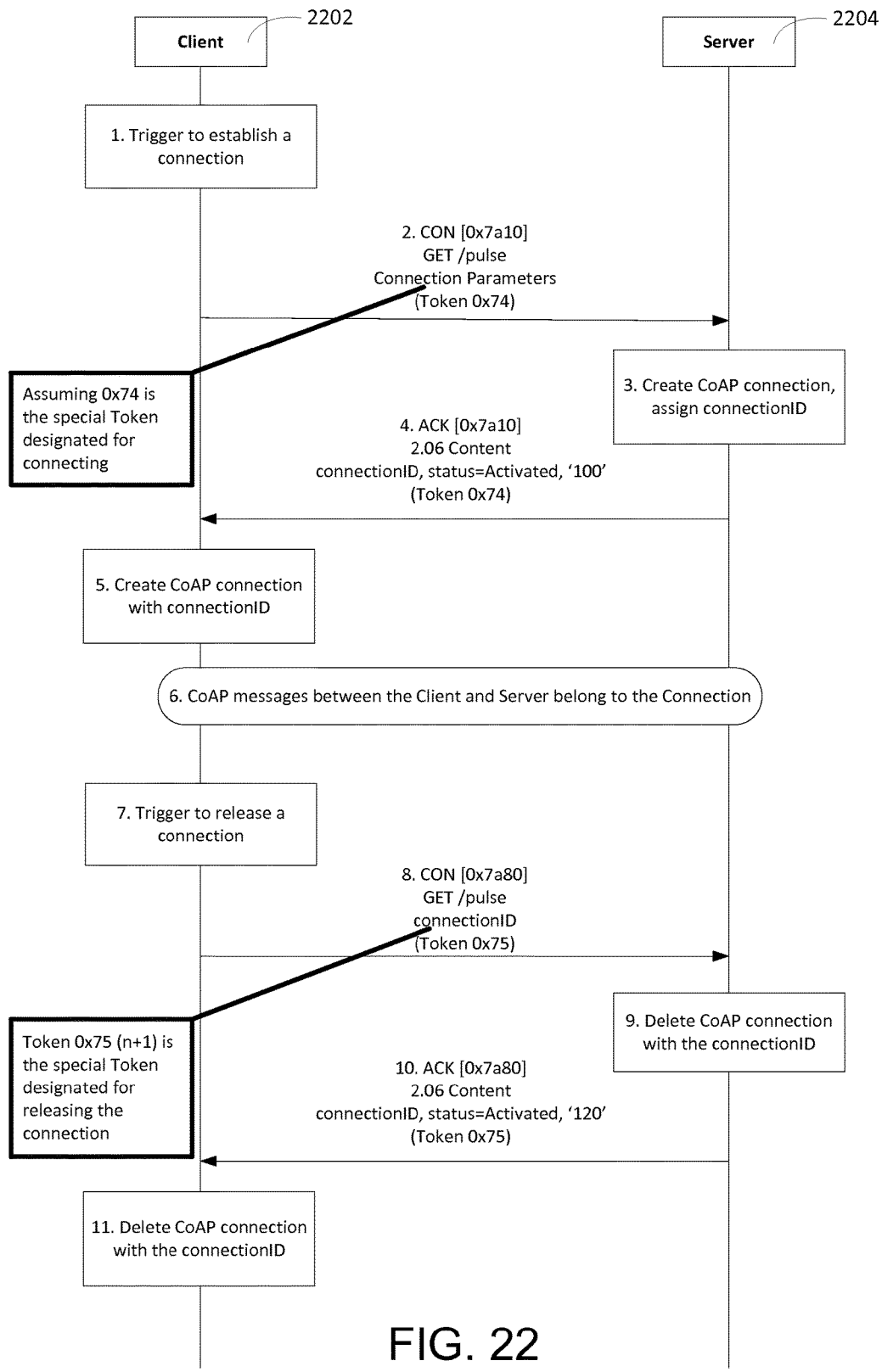
FIG. 22 illustrates one embodiment of a method for CoAP connection establishment and release using the CoAP Token Header.

FIGS. 21 and 22 illustrate another embodiment of a method for supporting CoAP connections using the CoAP Token Header of the CoAP protocol. Presently, CoAP supports four digits for the TKL field of a CoAP message, which defines 0-8 bytes of the Token Value, which follows the message header. FIG. 21 shows the location of TKL and Token in a CoAP message. Bytes 9-15 are currently reserved and specified as "must not be sent" by the CoAP base protocol. The Token field's value is generated by a client and may be used to match a response with a request.

In the present embodiment, a special range of token values (n . . . m) may be used to indicate a connection is needed/requested. The token values (n+1 . . . m+1) may be reserved to release the connection. For example, the special range of values may start from an even number n. Then, all the even numbers, n, n+2, n+4, etc., may be used to establish a connection. All the odd numbers, n+1, n+3, etc., may be used to release the corresponding connections identified as n, n+2, etc. Connection parameters may be exchanged using the beginning of the message payload.

FIG. 22 illustrates a method for CoAP connection establishment and release using the CoAP Token Header, in accordance with the present embodiment.

In steps 1-5, to establish a connection using a token, the CoAP client 2202 sends a request using the predefined special range of token value in the Token Header. In this example, the Token value used is "0x74". Per the above description, 0x74 would be "n". The payload includes the connection parameters. The recipient 2204 interprets the special token number as a request to establish a CoAP connection.

In steps 7-11, to release the connection, the CoAP endpoint that initiates the release sends a request with the token value set as 0x75, which is "n+1".

CoAP Connection Support with CoAP Proxy

Because CoAP supports proxies, the role of a proxy in CoAP connections is discussed hereinafter. In addition, a proxy may be used to enhance CoAP connections. Three different modes are presented hereinafter for a proxy to support CoAP connections.

1) Transparent Mode for CoAP Connections

Figure 23:
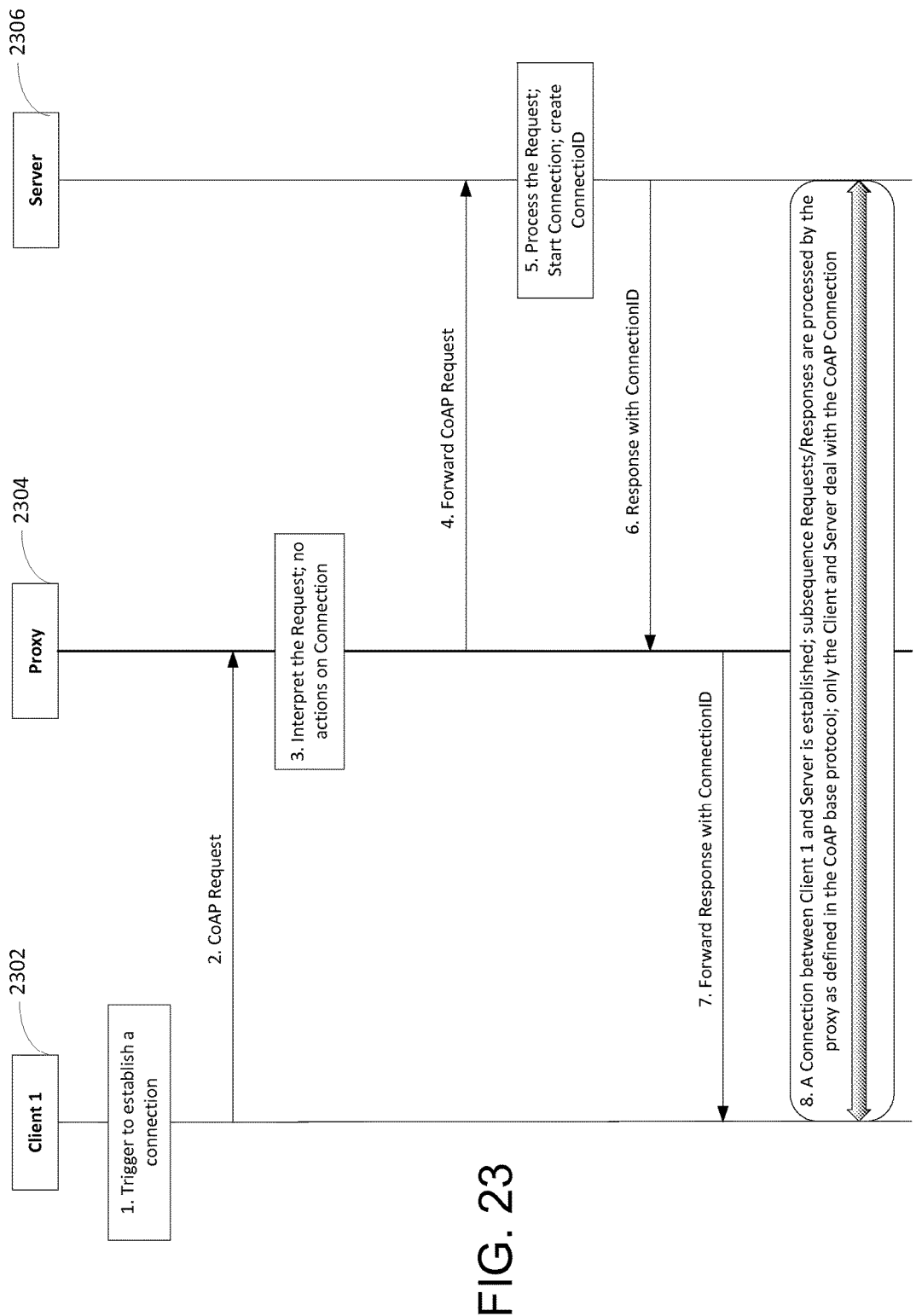
FIG. 23 illustrates one embodiment of a method for connection establishment using a proxy in a transparent mode.

In transparent mode, the proxy behaves as a traditional CoAP proxy, and it performs no processing in regard to CoAP connections. Therefore, the proxy does not need to support the CoAP connection functions. FIG. 23 illustrates a method for connection establishment in the transparent mode.

At step 1, Client 1 2302 triggers establishment of a connection.

At step 2, a CoAP request is sent to the proxy 2304, including the parameters for a connection. The client 2302 may use any approaches discussed in previous sections to request the connection.

In steps 3-4, the proxy 2304 does not perform any action regarding the connection request. It simply forwards the request to the server 2306.

In steps 5-7, the server 2306 processes the request, creates the connection, assigns the connectionID, and sends the response message with the connectionID back to the proxy 2304. The proxy 2304 then forwards the connectionID back to Client 1 2302.

At step 8, the connection is established between Client 1 and the server. The proxy forwards the requests by the client as defined in the CoAP protocol. Only Client 1 and the server perform connection-related operations.

2) Aggregation Mode for CoAP Connections

In this mode, a proxy may aggregate multiple CoAP connection requests from different clients together into a single connection. The decision to aggregate is based on policies within the proxy. An example policy may be to aggregate connections when multiple requests from different clients are targeted to the same server, include the same parameters, and all clients accept aggregation.

When a client sends a connection request, it may indicate in the proxyMode connection parameter if it will accept a proxy acting with connection aggregation, and when a client chooses proxy aggregation, the client may allow the proxy to choose the parameters of the connection.

One possible benefit of proxy aggregation is that it provides simplified procedures for both the CoAP client and server. The client only needs to indicate its request for a connection and its willingness to accept aggregation, and the proxy may apply connection parameters for multiple requests. With aggregation, the server has a reduced number of connections to handle.

The proxy may have different algorithms for the aggregation. For example, it may have a sliding-window time frame where all requests toward the same server within the time frame are aggregated.

Note that the mechanism discussed herein also works for non-proxy cases. The CoAP server may perform aggregation during the CoAP connection operation. For an aggregation operation, the server may establish one CoAP connection for multiple clients and return the same connectionID to each of these clients. When the server updates the connection instance, it may include messages from the multiple clients involved. The server may make the decision to perform aggregation based on its load.

Figure 24:
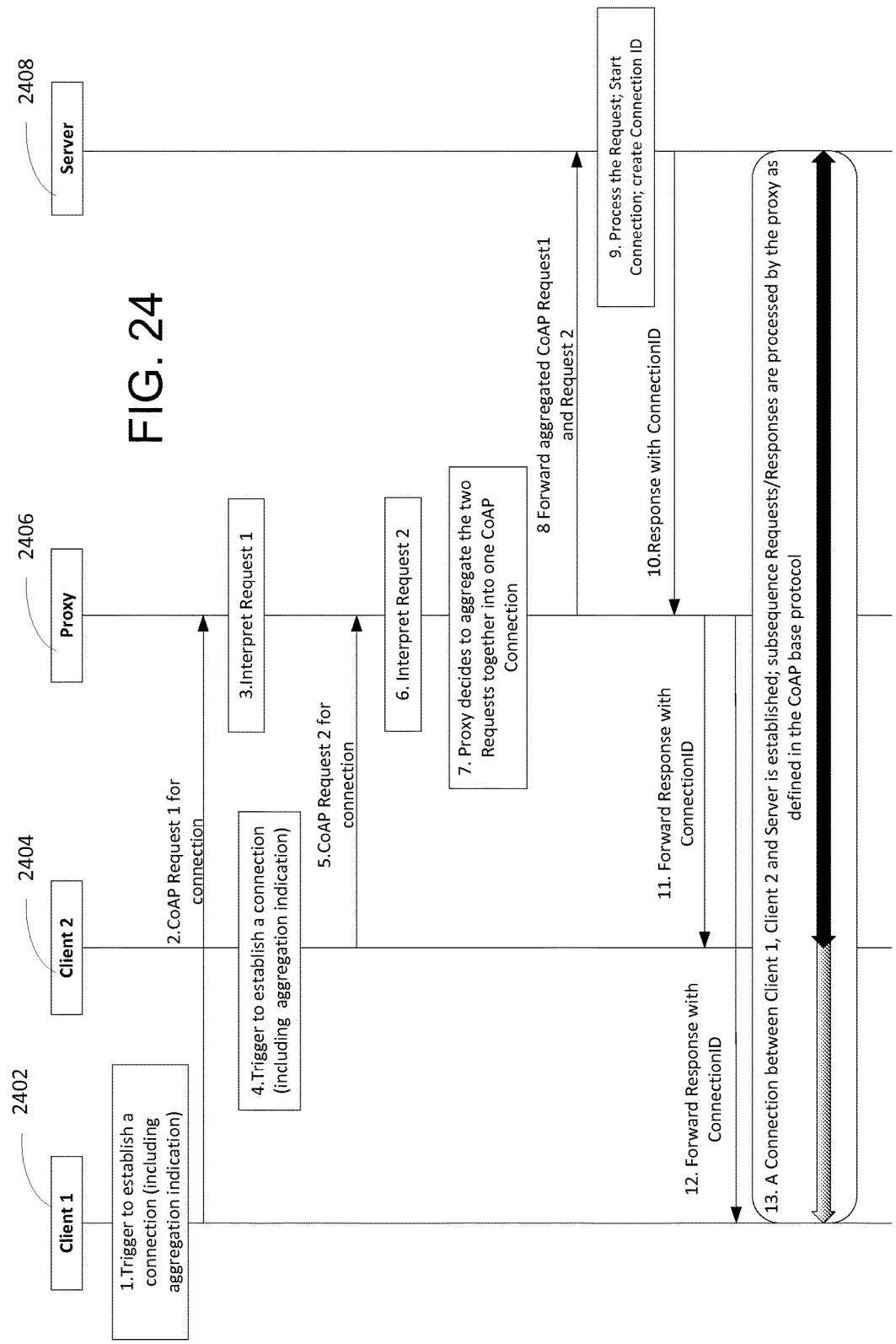
FIG. 24 illustrates one embodiment of a method for connection establishment using a proxy in an aggregation mode.

FIG. 24 illustrates one embodiment of a method for CoAP connection establishment in accordance with this Aggregation Mode.

In steps 1-6, at approximately the same time, the proxy receives a CoAP request from Client 1 2402 and Client 2 2404. Each request indicates that a connection is needed and that its aggregation is acceptable.

At step 7, the proxy 2406 processes the requests, and decides to put the two requests together (aggregate) to form one CoAP connection.

CoAP does not define a mechanism for a proxy to aggregate requests from clients. Each proxy may perform the function—step 8—differently. In one example, the proxy 2406 may deliver aggregated requests under the same message ID. In another example, the requests may perform the same task(s) for different clients, such as when many clients request to read the same data from the server. The proxy may aggregate the many client requests into one request, and the proxy may dispatch the responses to each requesting client.

In steps 9-12, the server 2408 processes the requests and assigns one connectionID to the multiple requests. The proxy 2406 then dispatches the responses containing the same connectionID to Client 1 and Client 2. In the responses, the server may inform each client about other participants in the connection.

At step 13, a connection involving multiple participants is established, e.g., from Client 1 to the server and from Client 2 to the server. Note that the endpoints of the connection are the clients and the server. The proxy is not an endpoint to the connection. Participants in the same connection may choose to exchange context information if the "contextSharing" parameter is enabled.

3) Relay Mode for CoAP Connections

Figure 25:
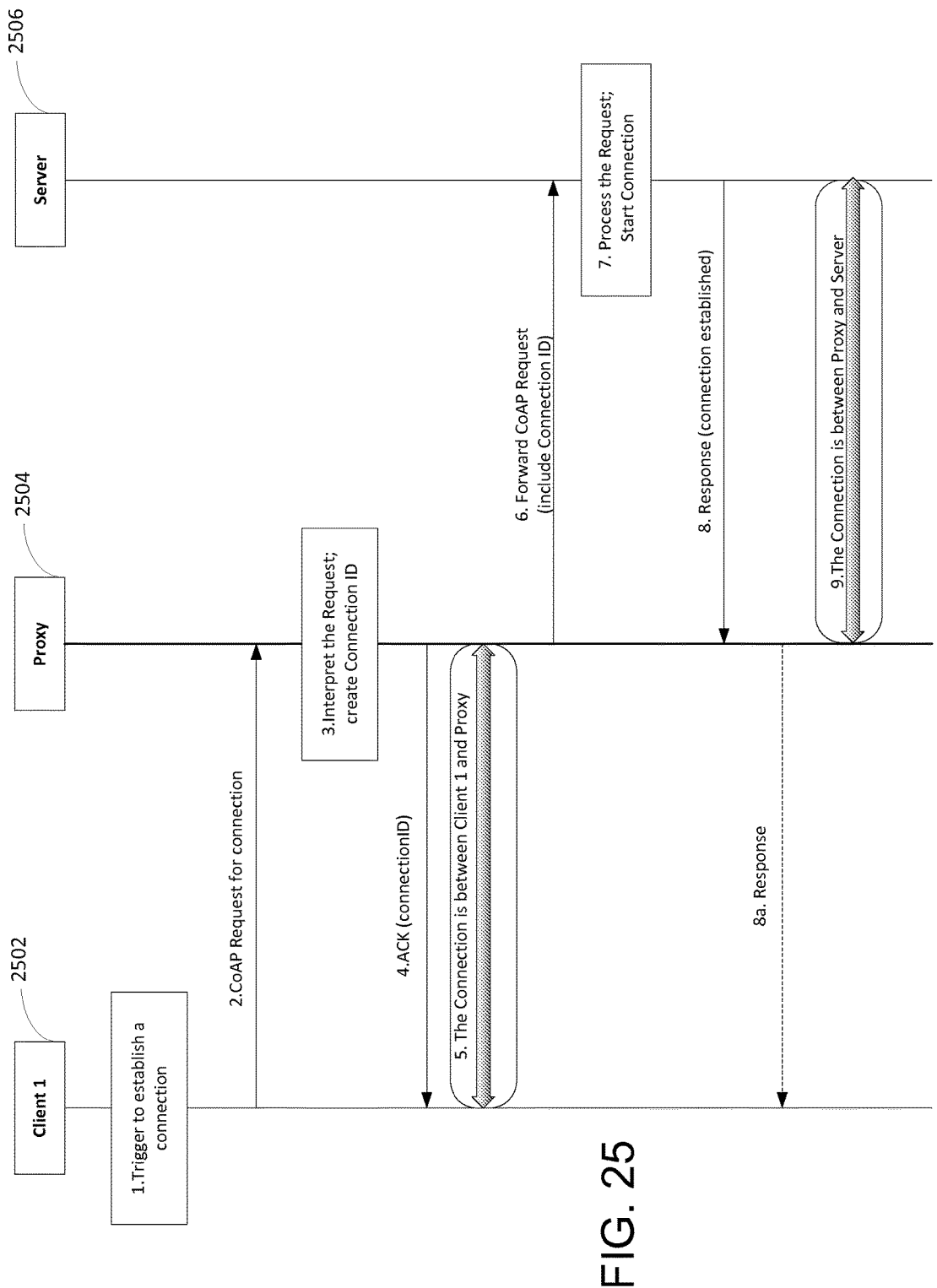
FIG. 25 illustrates one embodiment of a method for connection establishment using a proxy in a relay mode.

FIG. 25 illustrate one embodiment of another method for establishing a CoAP connection, in which a proxy 2504 is active in the connection and acts as a middle man.

At step 1, the client 2502 triggers establishment of a connection.

At step 2, the client sends a CoAP request, using any of the approaches mentioned above.

In steps 3-4, the proxy 2504 intercepts the request and acts as an endpoint for the connection request. The proxy creates a connection ID and sends an ACK to the client with the connectionID.

At step 5, the connection is established between the client and the proxy.

In steps 6-9, the proxy forwards the request to the designated server 2506. The server processes the request as if receiving it from the client directly.

Step 8a is shown as a dotted line to indicate that it may or may not be needed. If the proxy contains a cached result from the server pertaining to the client's request and is able to reply the cached result to the client in step 4, the proxy may not need to send this response (Step 8a) because the client will already have its answer.

In relay mode, the proxy is active in the connection. To the client, it is like having a connection with the server, and to the server, it is like having a connection with the client. The client and the server operate on the CoAP connection as if directly connected. The proxy may keep the connection instances for both the client and the server and may also keep a "virtual" state for one endpoint in the connection. For example, if the server goes down, the proxy can keep the connection state for both portions of the connection and update the server when the server become operable. When either the client or the server releases the connection, both endpoints of the connection should be released.

The relay proxy may also act as an aggregation proxy. If multiple requests toward the same server from different clients arrive in a specified time frame and all indicate accepting aggregation, the relay proxy may aggregate the requests and send one request to the server.

CoAP Connection Method Using LW-Websocket

The methods described above make use of native CoAP operations, i.e., they involve uses of, or enhancements to, the CoAP base protocol. In another embodiment described hereinafter, a method for establishing CoAP connections utilizes and enhances the WebSocket protocol. As previously mentioned, the WebSocket protocol can provide connections for HTTP over TCP. The WebSocket protocol may be extended to run over other underlying protocols. However, such extensions are not currently specified. In the CoAP over WebSocket described hereinafter, CoAP messages are enabled over traditional HTTP/TCP networks using WebSocket. Specifically, the WebSocket protocol is used to provide connections for a CoAP client and server. The WebSocket protocol is used as a tool to achieve CoAP connections, and the CoAP communication may switch on and off from WebSocket. Changes to the WebSocket protocol are also proposed to enable it to work with CoAP/UDP.

Enhancements to the WebSocket protocol to support CoAP connections are referred to herein as LW (Lightweight) WebSocket protocol to differentiate the enhanced protocol described herein from the current WebSocket protocol. It is "lightweight" because it can use UDP. The current WebSocket opening handshake is based on a HTTP request line. When WebSocket works with CoAP, the opening handshake may be changed using the alternatives described herein, and the parameters provided in the handshake, such as "Sec-WebSocket-Key" and "Sec-WebSocket-Protocol", may be placed in the payload of the CoAP message.

Figure 26:
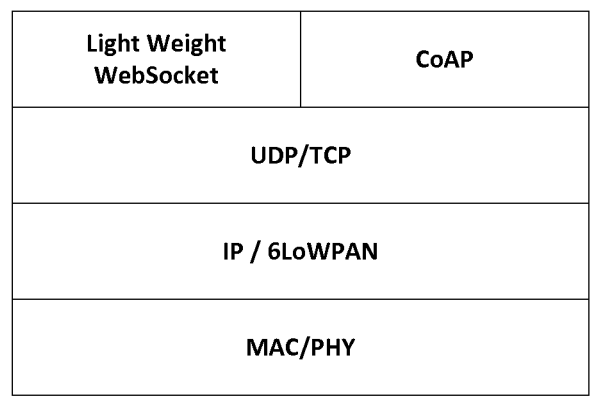
FIG. 26 illustrates the abstract layering of one embodiment of a protocol stack of a LW-WebSocket protocol.

FIG. 26 illustrates one embodiment of an abstract layering of the LW-WebSocket protocol stack disclosed herein. Alternative ways to initiate LW-WebSocket for CoAP are disclosed herein.

In one alternative, the CoAP protocol may support a new method code for "UPGRADE". In this alternative, a CoAP request message containing the "UPGRADE" method may upgrade WebSocket to LW-WebSocket. The LW-WebSocket-specific parameters, such as "Sec-WebSocket-Key" and "Sec-WebSocket-Protocol", may then be placed in the payload of the CoAP message.

In another alternative, an elective CoAP Option may be defined as "LWWebSocket Enabled". This would indicate if the LW-WebSocket is enabled or disabled. Similarly to the first alternative, the WebSocket parameters may be placed in the CoAP message payload.

Figure 27:
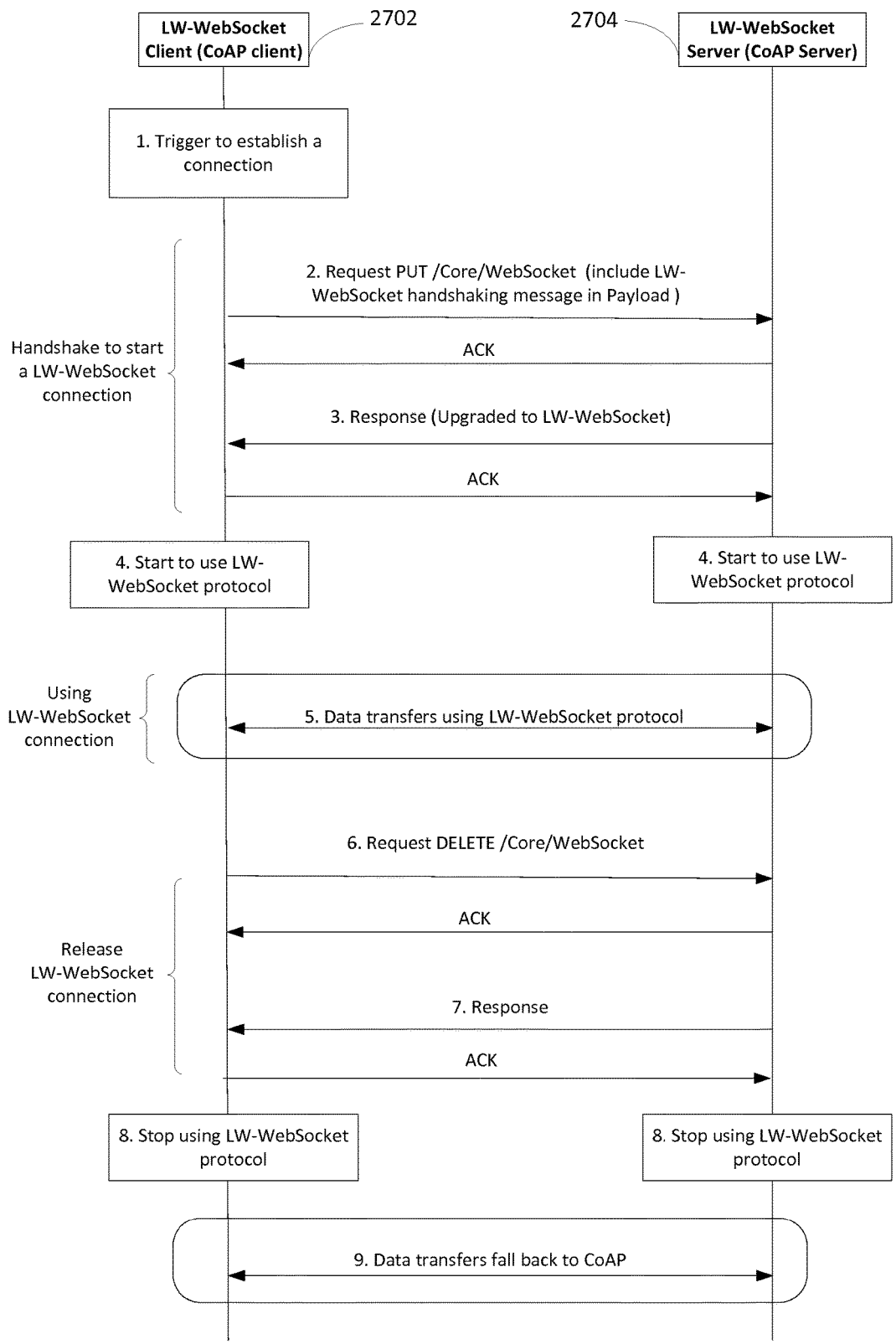
FIG. 27 illustrates one embodiment of a method for establishing a CoAP connection using an LW-WebSocket protocol.

In yet another alternative, the CoAP PUT and DELETE methods may be used on a specific directory, such as "/Core/WebSocket", to enable and disable upgrading to LW-WebSocket. FIG. 27 illustrates one embodiment of a method for establishing a CoAP connection using this alternative. In this embodiment, the client 2702 contains both a CoAP client and a LW-WebSocket client, and the server 2704 contains both the CoAP server and LW-WebSocket server.

There are also alternative ways to end a LW-WebSocket connection. In one alternative, no specific mechanism is required to close the handshake at the CoAP level because the current WebSocket protocol supports the client and server exchanging closing frames, and this mechanism may be re-used. In another alternative, the CoAP client may explicitly indicate "LWWebSocket Disabled". In yet another alternative, the CoAP client may use the CoAP DELETE operation on the specific directory used to establish the connection, such as "/Core/WebSocket". In the example embodiment of FIG. 27, the latter alternative is employed.

Referring to FIG. 27, at step 1, the CoAP client 2702 triggers the establishment of a CoAP connection.

In steps 2-3, a special CoAP PUT request is sent, using a CoAP CON, towards the /Core/WebSocket directory. The message includes the LW-WebSocket parameters in its payload.

At step 4, upon receiving the indication and ACK messages, both the client 2702 and server 2704 start to use the LW-WebSocket protocol.

At step 5, data frames are transferred between the client and server as defined in the WebSocket protocol.

In steps 6-7, the client initiates the release of the LW-WebSocket connection by issuing a CoAP DELETE message towards the directory /Core/WebSocket. Note that the WebSocket closing frames may also be used to release the WebSocket connection.

At step 8, upon receiving the ACKs from each other, both the client and server stop using LW-WebSocket.

At step 9, the data transfers between the client and server fall back to CoAP/UDP, and the CoAP connection using LW-WebSocket is terminated.

CoAP Connection And Service Layer Session

Figure 28:
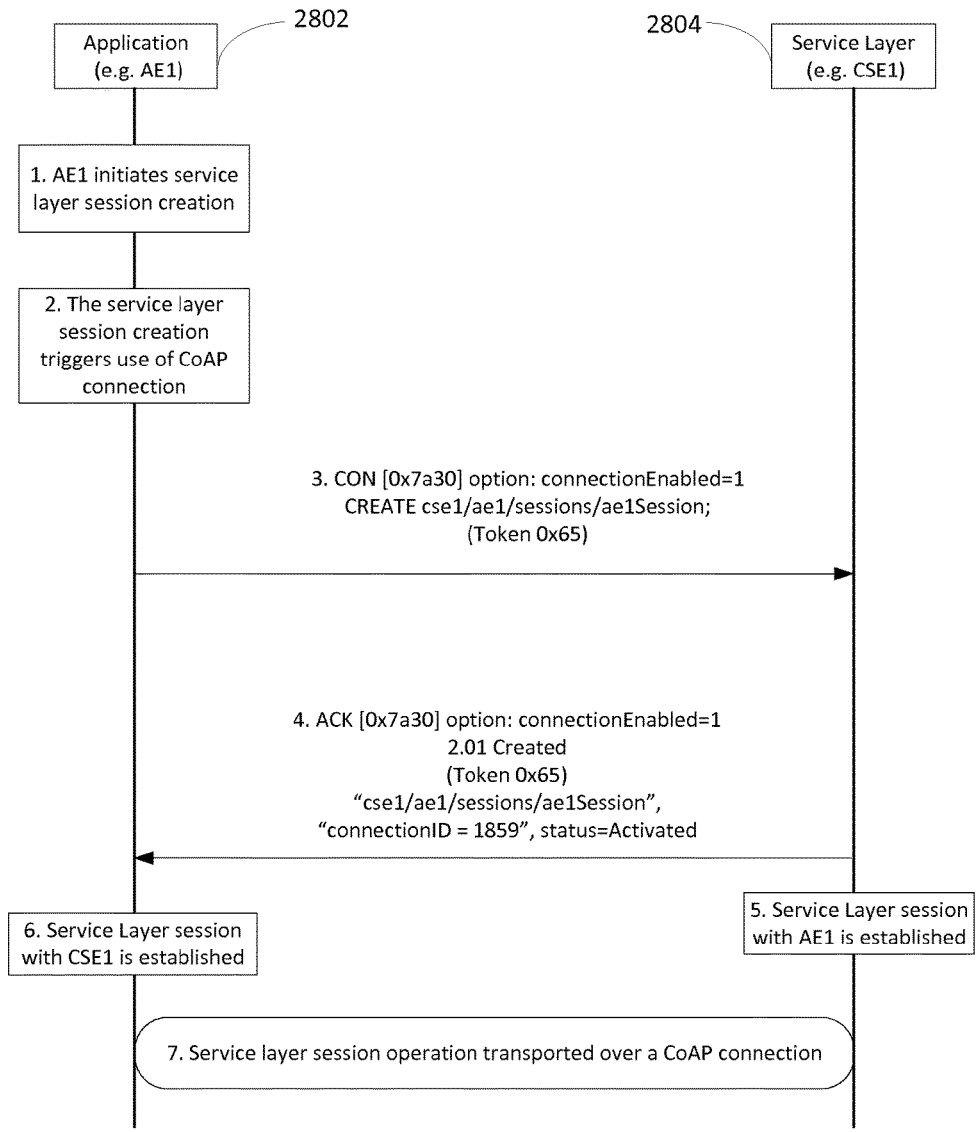
FIG. 28 illustrates one embodiment of a method of using a CoAP connection for a service layer session establishment operation.

CoAP connections may co-exist with and may support service layer sessions, such as those that may be present in a communications network that operates in accordance with the oneM2M functional architecture. For example, a CoAP connection may include a CoAP-level transaction status in its Connection Parameters for the service layer session. FIG. 28 illustrates one embodiment of a method of using a CoAP connection for a service layer session establishment operation.

At step 1, the service layer involves an application 2802, herein called AE1, and a service layer entity 2804, herein called CSE1. AE1 initiates a service layer session establishment procedure.

At step 2, in the call flow of step 1, the service layer uses CoAP as the transport protocol. The service layer may have a policy, for example, always triggering CoAP connections when a service layer session is required.

At step 3, in this example, the method of using a CoAP Option to establish a CoAP connection is illustrated. Other methods introduced above may be used as well. Using a CoAP Request message, AE1 performs a service layer session establishment operation by creating a session resource at CSE1.

At step 4, the CoAP connection is established as described in previous sections of the paper. In the same step, the service layer session is established as well. In the CoAP Connection Parameters, the CoAP connection may include the newly created service layer session identifier to associate to the service layer session.

At step 5, CSE1 establishes a service layer session with AE1 and maintains the session record.

At step 6, AE1 accordingly establishes a service layer session with CSE1 and maintains the session record.

At step 7, for subsequent operations, the service layer session operations are carried using the CoAP connection.

Similarly to the methods discussed above, the release of the service layer session may trigger the release of the associated CoAP connection.

Example M2M/IoT/WoT Communication System

Figure 29A:
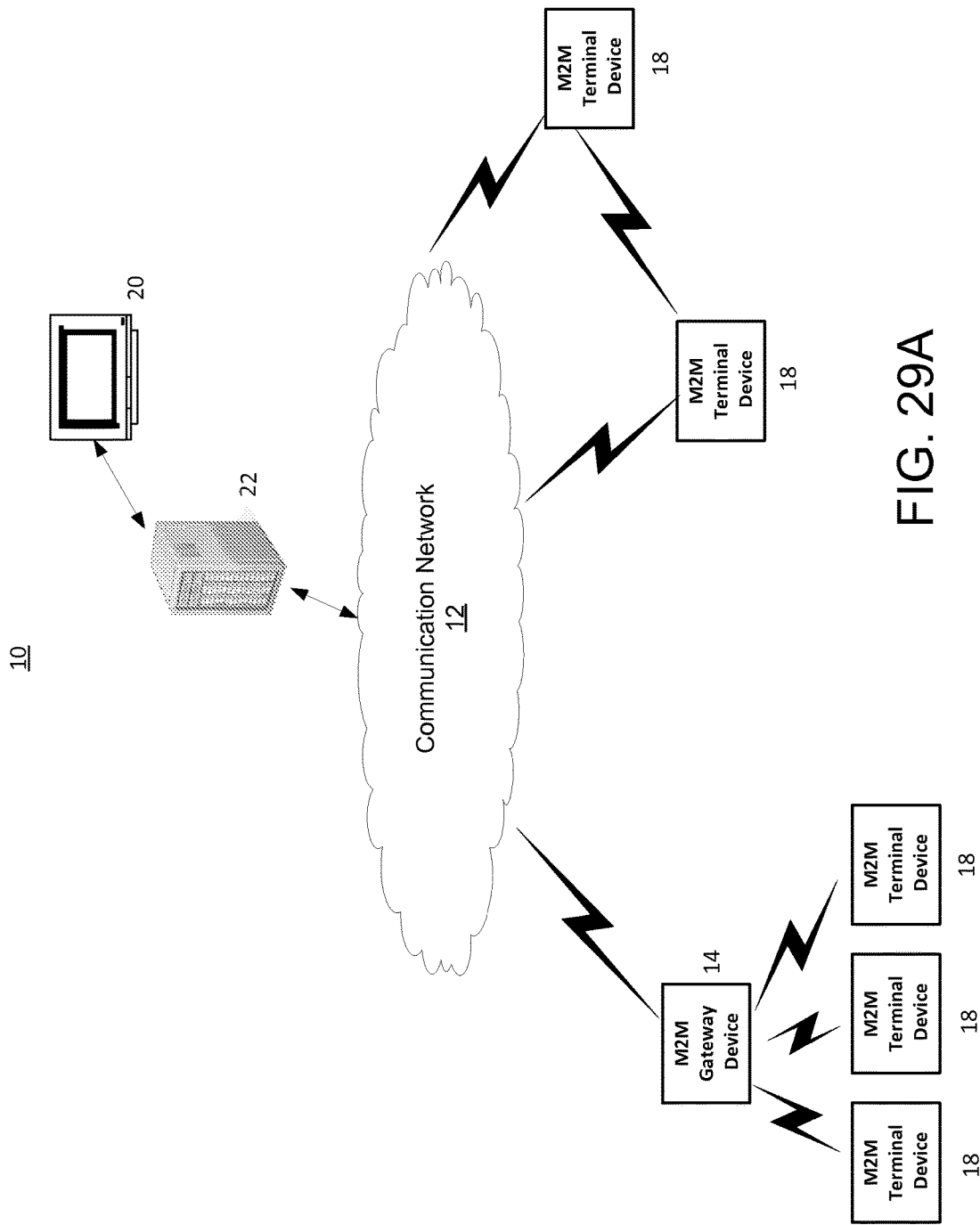
FIG. 29A is a system diagram of an example machine-to-machine (M2M), Internet of Things (IoT), or Web of Things (WoT) communication system in which one or more disclosed embodiments may be implemented.

FIG. 29A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Any of the client, proxy, or server devices illustrated in any of FIG. 12-16, 18-20, 22-25, 27, or 28 may comprise a node of a communication system such as the one illustrated in FIGS. 29A-D.

As shown in FIG. 29A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 29A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 29B:
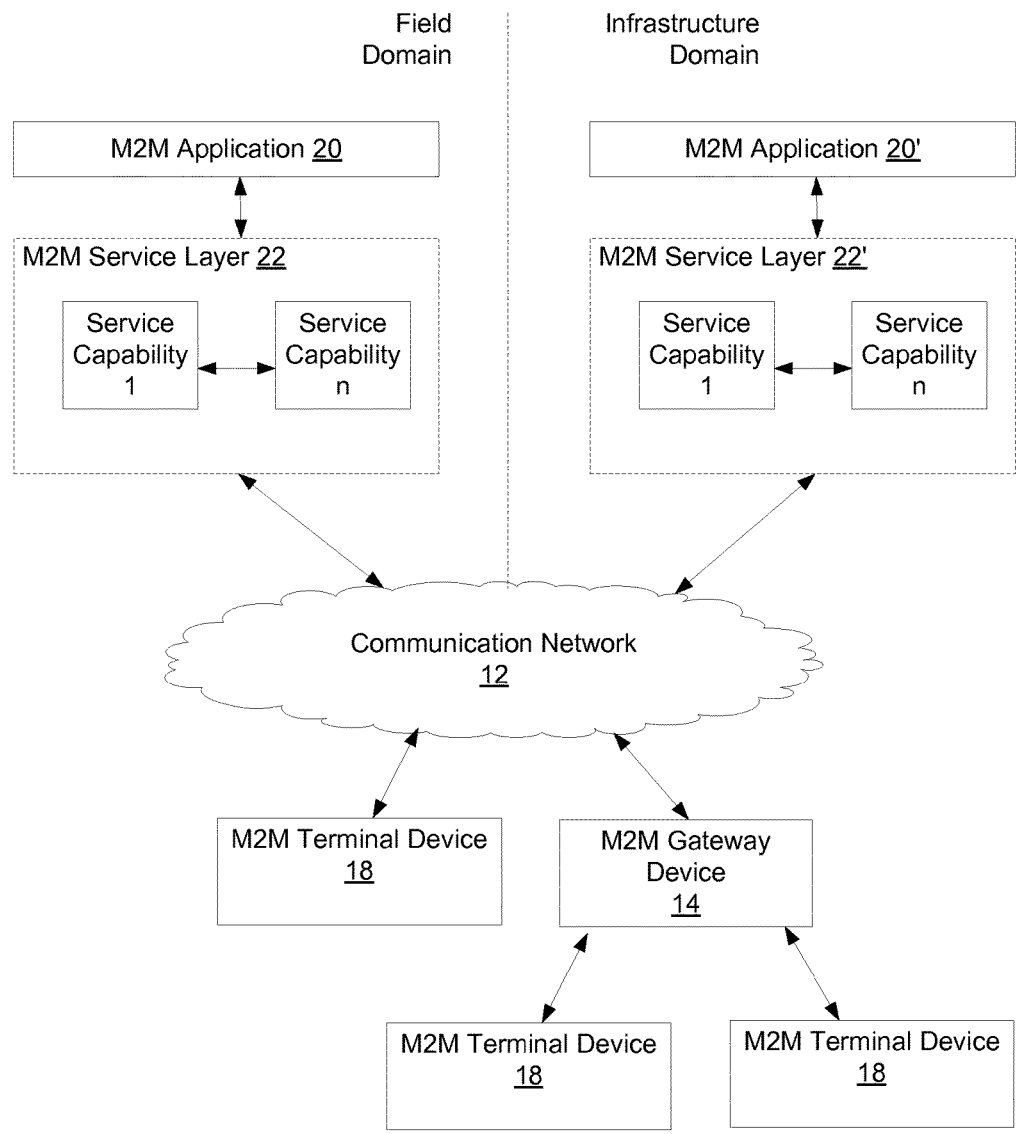
FIG. 29B is a system diagram of an example architecture that may be used within the M2M/IoT/WoT communications system illustrated in FIG. 29A.

Referring to FIG. 29B, the illustrated M2M service layer 22 in the field domain provides services for the M2M application 20, M2M gateways 14, and M2M devices 18 and the communication network 12. It will be understood that the M2M service layer 22 may communicate with any number of M2M applications, M2M gateways 14, M2M devices 18, and communication networks 12 as desired. The M2M service layer 22 may be implemented by one or more nodes of the network, which may comprises servers, computers, devices, or the like. The M2M service layer 22 provides service capabilities that apply to M2M devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M devices 18 in the field domain. It will be understood that the M2M service layer 22' may communicate with any number of M2M applications, M2M gateways and M2M devices. The M2M service layer 22' may interact with a service layer by a different service provider. The M2M service layer 22' may be implemented by one or more nodes of the network, which may comprises servers, computers, devices, virtual machines (e.g., cloud computing/storage farms, etc.) or the like.

Referring also to FIG. 29B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a service layer, such as the service layers 22 and 22' illustrated in FIGS. 29A and 29B, defines a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 29C or FIG. 29D described below.

Further, the methods and functionalities described herein may be implemented as part of an M2M network that uses a Service Oriented Architecture (SOA) and/or a Resource-Oriented Architecture (ROA) to access services.

Figure 29C:
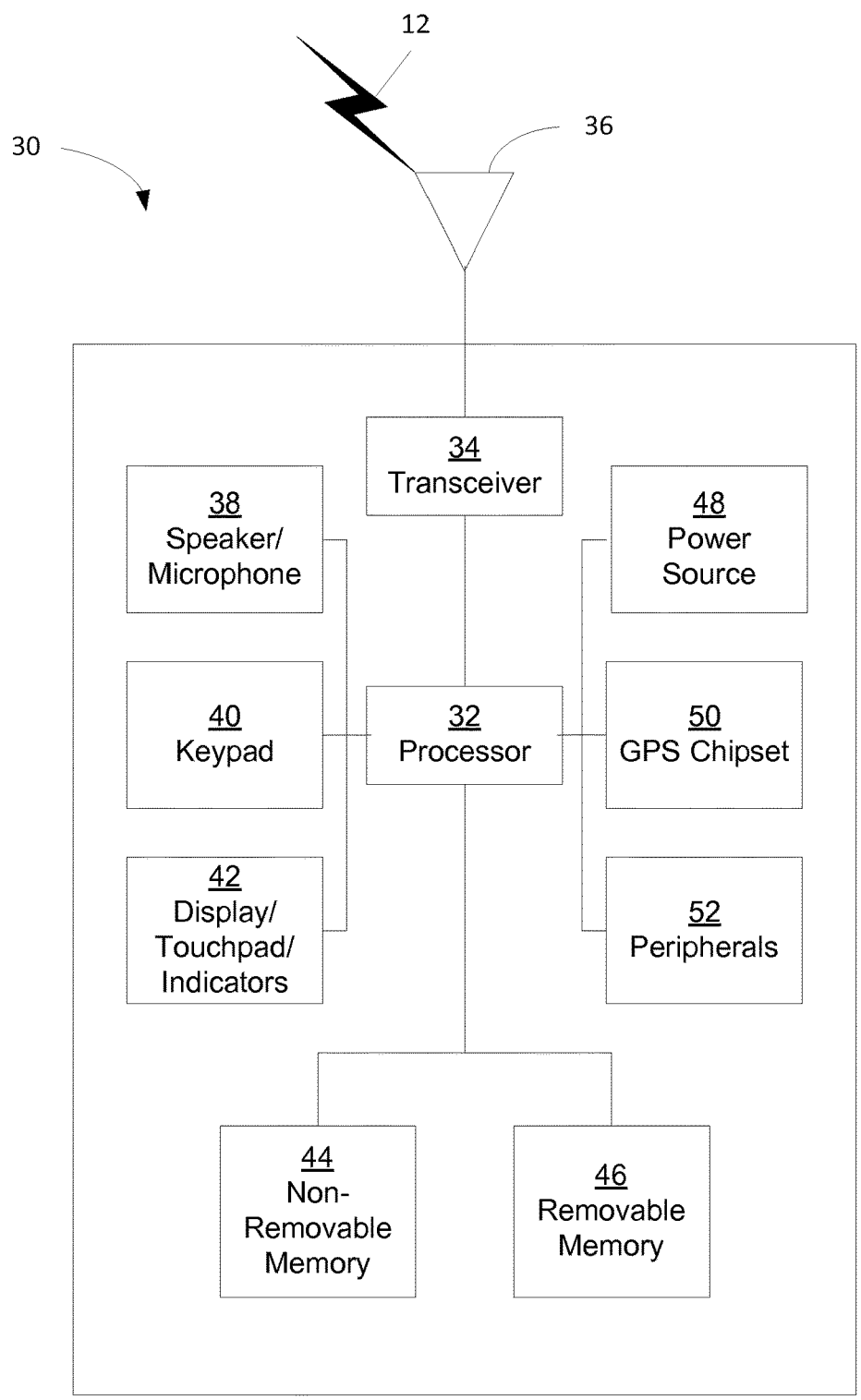
FIG. 29C is a system diagram of an example communication network node, such as an M2M/IoT/WoT device, gateway, or server that may be used within the communications system illustrated in FIGS. 29A and 29B.

FIG. 29C is a block diagram of an example hardware/software architecture of a node of a network, such as one of the clients, servers, or proxies illustrated in FIG. 12-16, 18-20, 22-25, 27 or 28 which may operate as an M2M server, gateway, device, or other node in an M2M network such as that illustrated in FIGS. 29A and 29B. As shown in FIG. 29C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the connection functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 29C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 12-16, 18-20, 22-25, 27, and 28) and in the claims. While FIG. 29C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 29C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42. In another example, the display may show information with regard to a session state. Additionally, the display 42 may be used to present a graphical user interface to a user—which, for example, may be layered on top of the RESTful user/application API described above for a oneM2M embodiment—to allow a user to interactively establish and manage a communication session via the session functionality described herein. An example of such a graphical user interface is illustrated in FIG. 11 and described above.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 29D:
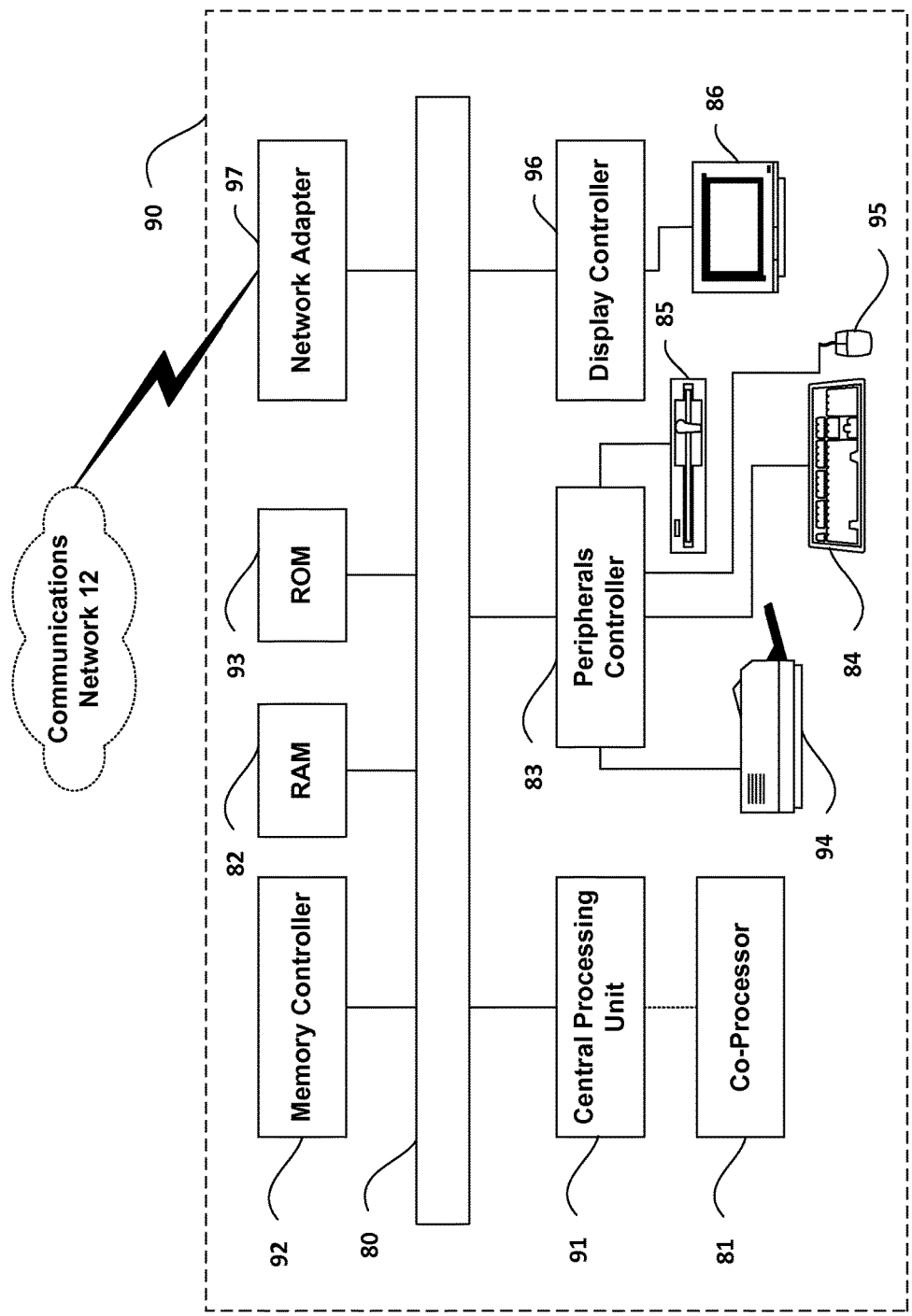
FIG. 29D is a block diagram of an example computing system in which a node of the communication system of FIGS. 29A and 29B may be embodied.

FIG. 29D is a block diagram of an exemplary computing system 90 which may also be used to implement one or more nodes of a network, such as the clients, servers, or proxies illustrated in FIG. 12-16, 18-20, 22-25, 27, or 28, which may operate as an M2M server, gateway, device, or other node in an M2M network such as that illustrated in FIGS. 29A and 29B. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for communication sessions.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. The display 86 may be used, for example, to display the example graphical user interface illustrated in FIG. 11 and described above.

Further, computing system 90 may contain communication circuitry, such as for example a network adaptor 97, that may be used to connect computing system 90 to an external communications network, such as network 12 of FIG. 29A and FIG. 29B, to enable the computing system 90 to communicate with other nodes of the network. The communication circuitry, alone or in combination with the CPU 91, may be used to perform the transmitting and receiving steps described herein (e.g., in FIGS. 12-16, 18-20, 22-25, 27, and 28) and in the claims.

It is understood that any or all of the systems, methods and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A node comprising a processor, a memory, and communication circuitry, the node being connected to a communications network via its communication circuitry, the node further comprising computer-executable instructions stored in the memory of the node which, when executed by the processor of the node, cause the node to:
receive, via the communication network from an other node on the network, a CoAP message indicating a request to establish a communication session between the node and the other node at a constrained application protocol (CoAP) layer of the network;
generate an identifier to uniquely identify the communication session between the node and the other node;
create an instance of the communication session in a memory of the node;
store, in the instance of the communication session, information about the communication session; and
send to the other node via the communication network, a CoAP response message acknowledging establishment of the communication session and including the communication session identifier.

2. The node recited in claim 1, wherein the message received from the other node comprises a CoAP PUT message that indicates the request to establish a communication session by addressing a pre-defined directory residing at the CoAP layer.

3. The node recited in claim 2, wherein creating an instance of the communication session in a memory of the node comprises creating a resource under the pre-defined directory in which to store information concerning the communication session.

4. The node recited in claim 3, wherein the computer-executable instructions further cause the node to:
receive from the other node a CoAP DELETE message specifying the communication session identifier; and
delete the resource containing information concerning the communication session, whereby the communication session is terminated.

5. The node recited in claim 1, wherein the message received from the other node includes a CoAP Option field that is set to indicate the request to establish a communication session.

6. The node recited claim 5, wherein the computer-executable instructions further cause the node to:
receive from the other node a subsequent message in which the CoAP Option field is set to indicate a request to terminate the communication session; and
delete the instance containing information concerning the communication session, whereby the communication session is terminated.

7. The node recited in claim 1, wherein the message received from the other node includes a CoAP Code Header field that is set to indicate the request to establish a connection session.

8. The node recited in claim 7, further comprising:
deleting the instance containing information concerning the communication session after a specified time period, whereby the communication session is terminated.

9. The node recited in claim 7, wherein the computer-executable instructions further cause the node to:
receive from the other node a subsequent message in which the CoAP Code Header field is set to indicate the connection is no longer needed; and
deleting the instance containing information concerning the communication session, whereby the communication session is terminated.

10. The node recited in claim 1, wherein the message received from the other node includes a CoAP Token Header field that is set to indicate the request to establish a connection session.

11. The node recited in claim 10, wherein the computer-executable instructions further cause the node to:
receive from the other node a subsequent message in which the CoAP Token Header field is set to indicate a request to terminate the communication session; and
delete the instance containing information concerning the communication session, whereby the communication session is terminated.

12. A method for creating a communication session between a first node and a second node over a communication network at a constrained application protocol (CoAP) layer of the network, the method comprising:
receiving, by the second node, from the first node, a CoAP message indicating a request to establish a communication session with the second node;
generating, by the second node, an identifier to uniquely identify the communication session between the first node and the second node;
creating, by the second node, an instance of the communication session in a memory of the second node;
storing, in the instance of the communication session, information about the communication session; and
sending, by the second node, to the first node, a CoAP response message acknowledging establishment of the communication session and including the communication session identifier.

13. The method recited in claim 12, wherein the message received from the first node comprises a CoAP PUT message that indicates the request to establish a communication session by addressing a pre-defined directory residing at the CoAP layer.

14. The method recited in claim 13, wherein creating an instance of the communication session in a memory of the second node comprises creating a resource under the pre-defined directory in which to store information concerning the communication session.

15. The method recited in claim 14, further comprising:
receiving from the first node a CoAP DELETE message specifying the
communication session identifier; and
deleting the resource containing information concerning the communication session, whereby the communication session is terminated.

16. The method recited in claim 12, wherein the message received from the first node includes a CoAP Option field that is set to indicate the request to establish a communication session.

17. The method recited claim 16, further comprising:
receiving from the first node a subsequent message in which the CoAP Option field is set to indicate a request to terminate the communication session; and
deleting the instance containing information concerning the communication session, whereby the communication session is terminated.

18. The method recited in claim 12, wherein the message received from the first node includes a CoAP Code Header field that is set to indicate the request to establish a connection session.

19. The method recited in claim 18, further comprising:
deleting the instance containing information concerning the communication session after a specified time period,
whereby the communication session is terminated.

20. The method recited in claim 18, further comprising:
receiving from the first node a subsequent message in which the CoAP Code Header field is set to indicate the connection is no longer needed; and
deleting the instance containing information concerning the communication session, whereby the communication session is terminated.

21. The method recited in claim 12, wherein the message received from the first node includes a CoAP Token Header field that is set to indicate the request to establish a connection session.

22. The method recited in claim 21, further comprising:
receiving from the first node a subsequent message in which the CoAP Token Header field is set to indicate a request to terminate the communication session; and
deleting the instance containing information concerning the communication session, whereby the communication session is terminated.

23. The node recited in claim 1, wherein the CoAP message indicating a request to establish a communication session between the node and the other node at a CoAP layer of the network is received via a proxy node.

* * * * *